United States Patent [19]

Hansen et al.

[11] Patent Number: 5,704,011
[45] Date of Patent: Dec. 30, 1997

[54] METHOD AND APPARATUS FOR PROVIDING MULTIVARIABLE NONLINEAR CONTROL

[75] Inventors: Peter D. Hansen, Wellesley Hills; Paul C. Badavas, Southboro, both of Mass.

[73] Assignee: The Foxboro Company, Foxboro, Mass.

[21] Appl. No.: 333,095

[22] Filed: Nov. 1, 1994

[51] Int. Cl.$^6$ .............. G05B 13/04; G05B 13/00
[52] U.S. Cl. .............. 395/22; 395/11; 395/20; 395/23; 395/903; 395/906; 364/164; 364/148
[58] Field of Search .............. 395/22, 11, 20, 395/23, 903, 906; 364/148, 164

[56] References Cited

U.S. PATENT DOCUMENTS

| | | | |
|---|---|---|---|
| 4,907,167 | 3/1990 | Skeirik | 364/500 |
| 5,111,531 | 5/1992 | Grayson | 395/23 |
| 5,119,468 | 6/1992 | Owens | 364/150 |
| 5,121,467 | 6/1992 | Skeirik | 364/148 |
| 5,175,678 | 12/1992 | Freirichs | 364/164 |
| 5,197,114 | 3/1993 | Skeirik | 364/148 |
| 5,212,765 | 5/1993 | Skeirik | 364/148 |
| 5,241,620 | 8/1993 | Ruggiero | 395/22 |
| 5,251,131 | 10/1993 | Masand et al. | 364/419.08 |
| 5,282,261 | 1/1994 | Skeirik | 395/22 |
| 5,354,957 | 10/1994 | Robertson | 187/247 |
| 5,394,322 | 2/1995 | Hansen | 364/148 |
| 5,461,699 | 10/1995 | Arbabi et al. | 395/22 |
| 5,471,381 | 11/1995 | Khan | 395/906 |
| 5,479,573 | 12/1995 | Keeler et al. | 395/23 |
| 5,486,998 | 1/1996 | Corso | 395/20 |
| 5,521,813 | 5/1996 | Fox et al. | 395/925 |
| 5,521,814 | 5/1996 | Teran et al. | 395/21 |
| 5,539,638 | 7/1996 | Keeler et al. | 364/424.03 |

FOREIGN PATENT DOCUMENTS

| | | | |
|---|---|---|---|
| WO9312476 | 6/1993 | WIPO | G05B 13/02 |
| WO9315448 | 8/1993 | WIPO | G05B 13/02 |

OTHER PUBLICATIONS

Application of Artifcial Neural Network for Nonlinear Model Predictive Behavior, Su, H-T, DisMascolo, N. and McAvoy, T. Apr. 22, 1993, University of Maryland.

*Primary Examiner*—George B. Davis
*Attorney, Agent, or Firm*—Jules Jay Morris; David Barron; Terrence Martin

[57] ABSTRACT

A method and apparatus for training and optimizing a neural network for use in controlling multivariable nonlinear processes. The neural network can be used as a controller generating manipulated variables for directly controlling the process or as part of a controller structure generating predicted process outputs. The neural network is trained and optimized off-line with historical values of the process inputs, outputs, and their rates of change. The determination of the manipulated variables or the predicted process outputs are based on an optimum prediction time which represents the effective response time of the process output to the setpoint such that the greatest change to the process output occurs as a result of a small change made to its paired manipulated variable.

37 Claims, 15 Drawing Sheets

METHOD AND APPARATUS FOR PROVIDING MULTIVARIABLE NONLINEAR CONTROL

BACKGROUND

1. Technical Field

This invention relates to industrial process controls, more particularly, for a method and apparatus for controlling multivariable, nonlinear, dynamic industrial processes.

2. Background Art

Industrial automation has continually strived towards attaining the optimum manner for controlling industrial processes in order to meet quality and production requirements. However, most modern industrial processes are complex requiring multiple control variables with interacting dynamics having time delays and lags, and nonlinearities. To handle such complex industrial processes, there have evolved various process control techniques.

Most current process control techniques determine the optimum operation of a process by monitoring one or more of the process's characteristics over time in order to adjust the operational parameters of the process. To compute the optimum operational parameters, especially in light of variations in the setpoint, system dynamics, and disturbances, these techniques may rely on a model of the plant process to predict the future behavior of the system. In some advanced techniques, this model, or part of it, is incorporated within a controller structure. The accuracy of these techniques relies on a precise dynamic model of the process. Such a model may not be available since some processes have uncertainties which can not be modeled precisely or simply.

Recently, neural networks have become an attractive means for modeling complex processes. This is because a neural network has the inherent ability to approximate a multivariable nonlinear function. The neural network is also advantageous since it does not require a complete or precise understanding of the process. Rather, it can acquire a representation of the process through its capacity to be trained and to learn by example. A neural network has the additional capability of handling delayed variables and, hence, represent dynamic systems.

The application of neural networks in the process control area is a relatively recent development. Nevertheless, various neural-network control systems have been developed. One such type is a control system which uses neural networks in the well established model predictive control framework. Typically, these types of control systems use a controller, employing a model of the process, to determine the manipulated variable which will put the process at the target value. Process feedback is provided through a process-model-mismatch signal which is applied to the setpoint thereby compensating for unmodeled disturbances. This mismatch signal is the difference between the process output and a modeled process output generated by a neural network of the process.

The controller consists of a neural network model and an optimizer. The neural network model is used to predict the effect of a possible manipulated variable trajectory on the process outputs over a future time trajectory taking into account present and recent past process input and output values. The optimizer uses this information to select values of the manipulated variables such that the process outputs optimally track the setpoint and satisfy a given set of constraints.

There are several limitations of this type of process control system. The primary limitation is that it does not handle effectively unmeasured load disturbances for a lag dominant process. Although the use of a model error feedback gives the system the capability to handle well a dead-time dominant process, the method does not stabilize a non-self regulating or an open-loop-unstable process unless some additional feedback is applied. There is no proportional or derivative feedback, only a quasi-integral feedback action provided through the process-model-mismatch signal. Furthermore, the controller output trajectory optimization is rerun at every control interval in order to determine the next manipulated variable change. This optimization may require substantial computation time requiring the interval between controller output updates to be undesirably large. This interval also adds further deadtime to the process dead-time thereby increasing the best achievable control error in response to an unmeasured load change.

It is an object of this invention to provide a robust and efficient process control system which accounts for the above mentioned limitations. More particularly, an optimal multivariable nonlinear control system which is robust, accommodates non-self regulating processes as well as pure dead time processes, requires no on-line optimization, compensates to prevent upsets by measured loads, and combats unmeasured disturbances with high feedback gain.

Other general and specific objects of this invention will be apparent and evident from the accompanying drawings and the following description.

SUMMARY OF THE INVENTION

This disclosure presents a method and apparatus for training and optimizing a neural network for use in a process control system. The neural network can be used as a controller producing a manipulated variable for directly controlling the process, as in the first and second embodiments. It can also be used as part of a controller structure or for process experimentation, as in the third and fourth embodiments.

The training and optimization of the neural network produced in the first embodiment is performed off-line and through the use of a second neural network. The first neural network is a prediction filter for future values of the controlled variables as a function of present inputs, controlled variables, and their rate of change. This neural network is then used to find the optimum prediction times and the corresponding predictions for each set of the neural-network input training data. Training may be performed by a standard method such as back propagation of prediction errors to adjust the neural network's parameters. This training and optimization process is performed off-line thereby eliminating the optimization overhead from the controller's performance. In the first embodiment, a second neural network is trained to output present values of the manipulated variables as a function of the first neural network's other inputs and the predicted controlled variables as advanced by the optimum prediction time. This network is also trained to output the optimum prediction times from the same set of inputs.

This neural network can then be used as a multivariable nonlinear controller as described in copending application entitled "Multivariable Nonlinear Process Controller", and filed the same date herewith. In this use, the neural network controller will produce stable closed loop performance with prompt minimal-overshooting response to a target or setpoint change, fast non-oscillatory rejection of measured load upsets, and anticipatory rejection of measured load upsets. The lowest frequency open-loop poles of the process may be unstable, since they can be stabilized by nonlinear, multivariable proportional and derivative feedback provided by this controller.

In the second embodiment, the neural network is trained in a similar manner as in the first embodiment but with inferential measurements of the process outputs rather than the controlled variable inputs. This produces a network which when used as a controller is able to control the process output at a faster rate than the rate at which the controlled variable is sampled.

The training and optimization of the neural network used in the third control embodiment is performed off-line and in a similar manner as the network in the first control embodiment. A first neural-network model is trained as a prediction filter for future values of the controlled variables. This neural network is then used to find the optimum prediction times. A second neural network is trained to output the optimum prediction times and the predicted values of the controlled variables as advanced by the optimum prediction times.

In the fourth embodiment, the neural network is trained with inferential measurements of the process outputs rather than controlled variable inputs and in a similar manner as the third embodiment. This produces a network which when used as part of a controller enables the controller to respond to process changes at faster intervals than the rate at which the controlled variable is sampled.

The neural network produced in the third and fourth embodiments can be used to explore the effects of a hypothetical sequence of constrained manipulated variables and load changes on the trajectories of future controlled variables. Alternatively, it can be incorporated as part of a process controller as described in copending application entitled, "A Method and Apparatus for Controlling Multivariable Nonlinear Processes" and filed the same date herewith.

BRIEF DESCRIPTION OF THE DRAWINGS

The foregoing and other objects, features and advantages of the invention will be apparent from the following more particular description of two preferred embodiments of the invention, as illustrated in the accompanying drawings in which like reference characters refer to the same elements throughout the different views. The drawings are schematic representations of control elements, emphasis being placed on illustrating the principles of the invention.

DESCRIPTION OF THE ILLUSTRATED EMBODIMENT

Figure 1:
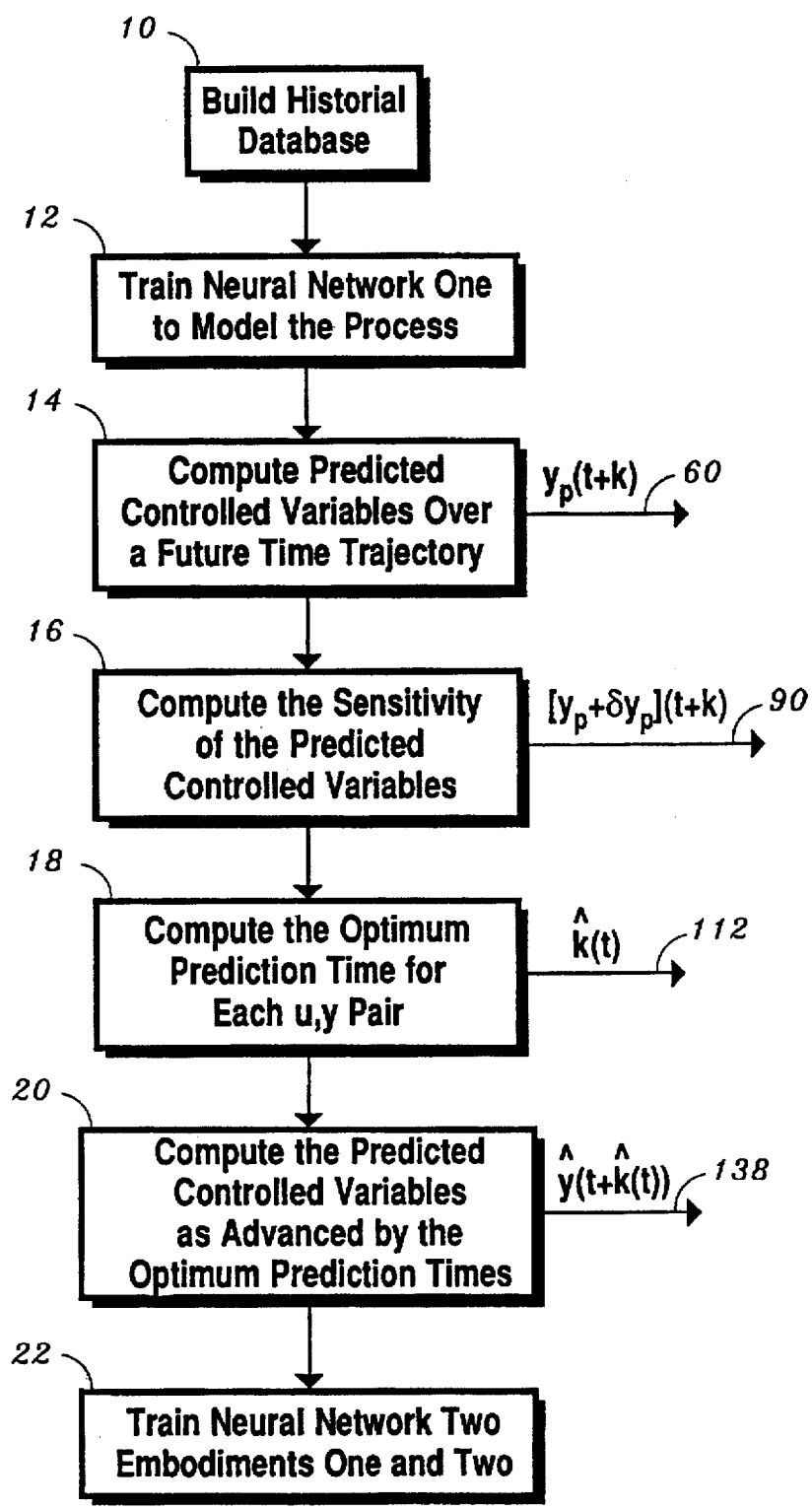
FIG. 1 is a flow chart illustrating the sequence of steps used in the first and second embodiments to train a neural network for use in a process control system.

Prior to describing the details of the invention, a brief synopsis of the signals used in the invention is presented.

t is an integer representing a particular time step of the process.

k is an integer value representing an arbitrary positive number of time steps.

u(t) manipulated variable—a vector of signals which represents a quantity or condition which is varied at time step t as to change the value of the controlled variable.

y(t) controlled variable—a vector of process output signals which represents the measured process output at time step t. For the purposes of this application, the terms controlled variable and process output are used synonymously.

y'(t) derivative of the controlled variable—a vector of signals which represents the rate of change with respect to time of the measured process output at time step t.

w(t) inferential variable—a vector of process output signals which inferentially represents the vector of controlled process outputs at time step t.

w'(t) derivative of the inferential variable—vector of signals which represents the rate of change at time step t.

$y_p(t+k)$ predicted controlled variable—a vector of model output signals which predicts the measured process output or controlled variable at time step t+k.

ŷ(t+k̂(t)) predicted controlled variable as advanced by the optimum prediction time—a vector of output signals which predicts the measured process output or controlled variable at time step t advanced by the optimum prediction time, k̂(t), in terms of inputs and input derivatives at time step t.

v(t) measured load variable—a vector of signals representing a known disturbance of a measured quantity occurring at time step t.

v'(t) derivative of the measured load variable—a vector of signals which represents the rate of change with respect to time of the measured load signal at time step t.

k̂(t) optimum prediction time—a vector of real numbers representing the relative time where the corresponding controlled variable, $y_i(t+k̂_i(t))$, is most sensitive to a change in its paired manipulated variable. For the purposes of this application, the terms delay time, dead time, and optimum prediction time are used synonymously.

For the purposes of this application, when the above notations are used in the text and diagrams, they denote a vector of signals. For example, u(t) represents a vector of manipulated variable signals, $u_1(t) \ldots u_n(t)$, and $y_p(t+k)$ represents a vector of predicted controlled variable signals, $y_{p1}(t+k_1) \ldots y_{p1}(t+k_q)$ to $y_{pn}(t+k_1) \ldots y_{pn}(t+k_q)$.

For the purposes of this application, the future time horizon is a future time step relative to time t which may be within the time span of the training data.

OVERVIEW

The invention is described below with reference to four embodiments which produce different neural networks. In all embodiments, the network is trained utilizing historical data to compute the optimum prediction times for each of the controlled variables. In the first and second embodiments, the network is further trained to identify the appropriate manipulated variables, and in the third and fourth embodiments, it is trained to identify the appropriate controlled variables. The network produced in the first and second embodiments can be used as a controller and the network in the third and fourth embodiments can be used for process experimentation or utilized as part of a controller.

THE FIRST EMBODIMENT

In the first embodiment, a neural network is trained to produce, for each controlled variable at each time step t in the process, the optimum prediction time and the manipulated variable used to place the process rapidly and stably at the desired setpoint. When this network is used as a controller, the optimum prediction time becomes the effective response time of the controlled variable to the setpoint. This prediction time represents a future time where the greatest change in the controlled variable occurs as a result of a small change made to its paired manipulated variable. As a controller, the optimum prediction time represents the situation where the least manipulated variable change is required to place the future controlled variable at its target value or setpoint. If another time were used, the manipulated variable change would be larger resulting in an over correction and therefore oscillatory and possibly unstable behavior.

This preparation is depicted in FIG. 1 and encompasses seven steps performed by several computer processing units. In the first step, a data base is created containing historical data for the measured load variables, paired controlled and manipulated variables, derivatives of the measured load variables, and derivatives of the controlled variables. Optionally, the inferential variables and their derivatives may be included. Step 12 uses the data from the historical data base to train a first neural network to compute the function which will produce the controlled variables advanced by future time steps, $k_j$, for j=1 to q. This neural network is then applied in step 14 to produce predicted controlled variables advanced by each of these future steps, $y_{pi}(t+k_j)$, for i=1 to n, j=1 to q. It is then reapplied in step 16 with a small change in the manipulated variable input producing a second set of controlled variables reflecting this change, $[y_p+\delta y_p](t+k)$. The outputs from both applications of neural network one are then used in step 18 to determine the optimum prediction time by interpolation for each pair of manipulated and controlled variables. The corresponding controlled variable at the optimum prediction time is computed by interpolation in step 20. A second neural network is trained in step 22 using the historical and interpolated data to produce the function which will compute the appropriate manipulated variables and the optimum prediction times.

STEP ONE

The first step of the preparation consists of building an historical data base containing the time histories of the process's inputs and outputs. These time histories can be collected, over a given time span, $t_0 < t < t_1$, and stored in a historical data base. The length of the time span can vary from a day, a week, a month, or any user-specified time span. The historical data may have been previously collected and existing in stored files. It can also be collected during the operation of the process by sampling measurements of the process's input and output signals at an appropriate sampling rate. The derivatives of the historical data, with respect to time, can be either computed from the sampled data or measured directly. The use of the derivatives also eliminates the need for additional delayed inputs, thereby producing a simple model of the process where all of the inputs and their time derivatives are concurrent (i.e. all at the same time step t) and therefore independent. Additionally, the data needs to be collected with the same downstream control structure as when the network is used as a controller since the manipulated variable directly drives the downstream controllers which modulate the process.

Figure 2:
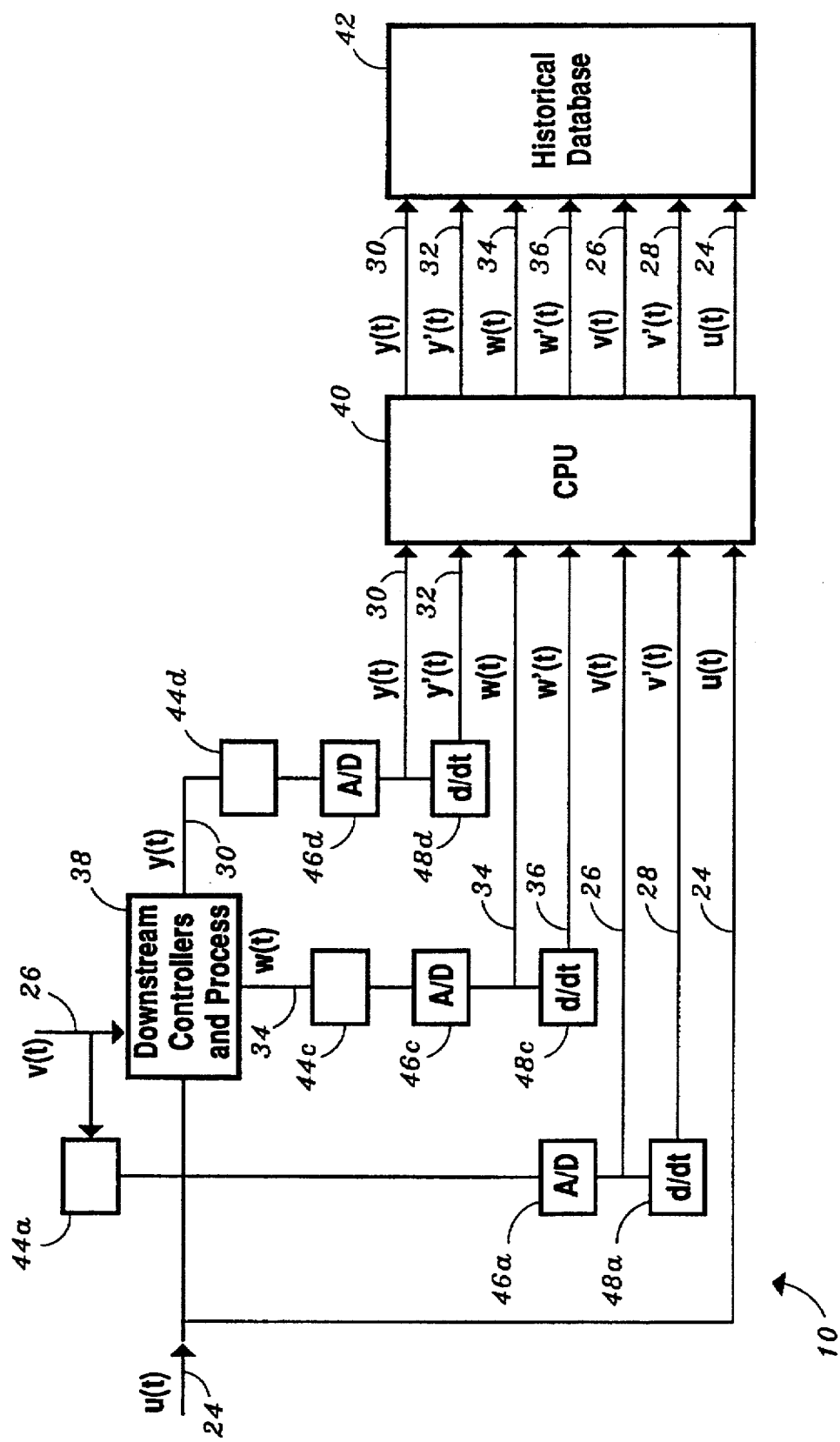
FIG. 2 depicts the operation of building the historical data base according to the preferred practice of the invention.

FIG. 2 illustrates one aspect of building the historical data base by collecting the time histories of the process over a given time span. Training system 10 consists of the downstream controllers and the process, 38, sensor units 44a, 44c, and 44d, A/D converter units 46a, 46c and 46d, differential processing units 48a, 48c, and 48d, central processing unit (CPU), 40, and a data base storage memory, 42.

The sensor units serve to measure the process inputs and outputs over the time span, producing an analog electric signal representative thereof which is further transmitted to the A/D converter units. These sensor units can be pressure, flow, temperature, or any other type of sensor unit suitable for detecting a mechanical, electrical, or chemical condition of the process being monitored. Sensor unit 44a, monitors the measured load variables, v(t), 26, and sensor unit 44d, monitors controlled variables, y(t), 30. In the second and fourth embodiments, sensor unit 44c is utilized thereby monitoring the inferential variables, w(t), 34, as well. Sensor units 44c and 46c are both shown in FIG. 2 for illustration purposes only and do not imply that they need to be present for this embodiment to work.

Some of these sensor units produce an analog signal representative of the respective quantity measured. They are also coupled to A/D converter units which convert the analog signals into their digital equivalents. A/D converter units, 46a, 46c, and 46d, can be of the type conventionally used for transforming analog electrical data signals into digital electrical data signals, which are well known in the area of digital signal processing. The output of the A/D converter units is a digital signal representative of the respective quantity measured. For example, A/D unit 46a generates the digital form of the measured load variables, v(t), 26, unit 46c generates the digital form of the inferential variables, w(t), 34, and unit 46d, generates the digital form of the controlled variables, y(t), 30. The manipulated variables, 24, are produced in digital form thereby not requiring an A/D converter. These digital signals, 24, 26, 34, and 30 are then transmitted to CPU 40.

A/D converter unit 46a is coupled to differential processing unit 48a, unit 46c is coupled to differential processing unit 48c, and unit 46d is coupled to differential processing unit 48d. Each of these differential processing units generates a differential signal representative of the rate of change, with respect to time, of the signal measured by the corresponding sensor unit. For example, differential processing unit 48a generates the derivative of the measured load variable, v'(t), 28, differential unit 48c generates the derivative of the inferential variable, w'(t), 36, and differential unit 48d generates the derivative of the controlled variable, y'(t), 32. Each of these signals, 28, 32, and 36 are then transmitted to CPU 40. Alternatively, it should be apparent by one of ordinary skill in the art of electrical engineering that the function of the differential processing units can be optionally implemented as a software module performed by CPU 40. Signals 30, 34, and 26 can be transmitted to CPU 40 where the derivatives of the respective signals can be computed.

CPU 40 receives signals 24, 26, 28, 30, 32, and 34 and stores these electrical data signals indexed according to time step, t. The manipulated and controlled variables are paired and may be paired in accordance with Bristol's Relative Gain Array as described in F. G. Shinskey, *Process Control Systems*, third edition, McGraw-Hill Book Company, New York, 1988. However, this invention is not limited to this pairing scheme, others may be used so long as the choice of the pairs is determined such that the non-paired manipulated variables have a lesser effect on the paired controlled variables. This pairing is used to choose the process output that will be uncontrolled when downstream limiting of a manipulated variable is detected.

Thus, at the completion of this step, the historical data base contains a vector of n controlled variables 30 ($y_1(t)$ . . . $y_n(t)$); optionally, a vector of n inferential variables 34 ($w_1(t)$ . . . $w_n(t)$) and a vector of n derivatives of inferential variables 36 ($w'_1(t)$ . . . $w'_n(t)$); a vector of n manipulated variables 24 ($u_1(t)$ . . . $u_n(t)$); a vector of n derivatives of the controlled variables 32 ($y_1'(t)$ . . . $y_n'(t)$) a vector of m measured load variables 26 ($v_1(t)$ . . . $v_m(t)$); and a vector of m derivatives of the measured load variables 28 ($v_1'(t)$ . . . $v_m'(t)$), for all time steps over a given time span, $t_0<t<t_1$.

STEP TWO

Figure 3:
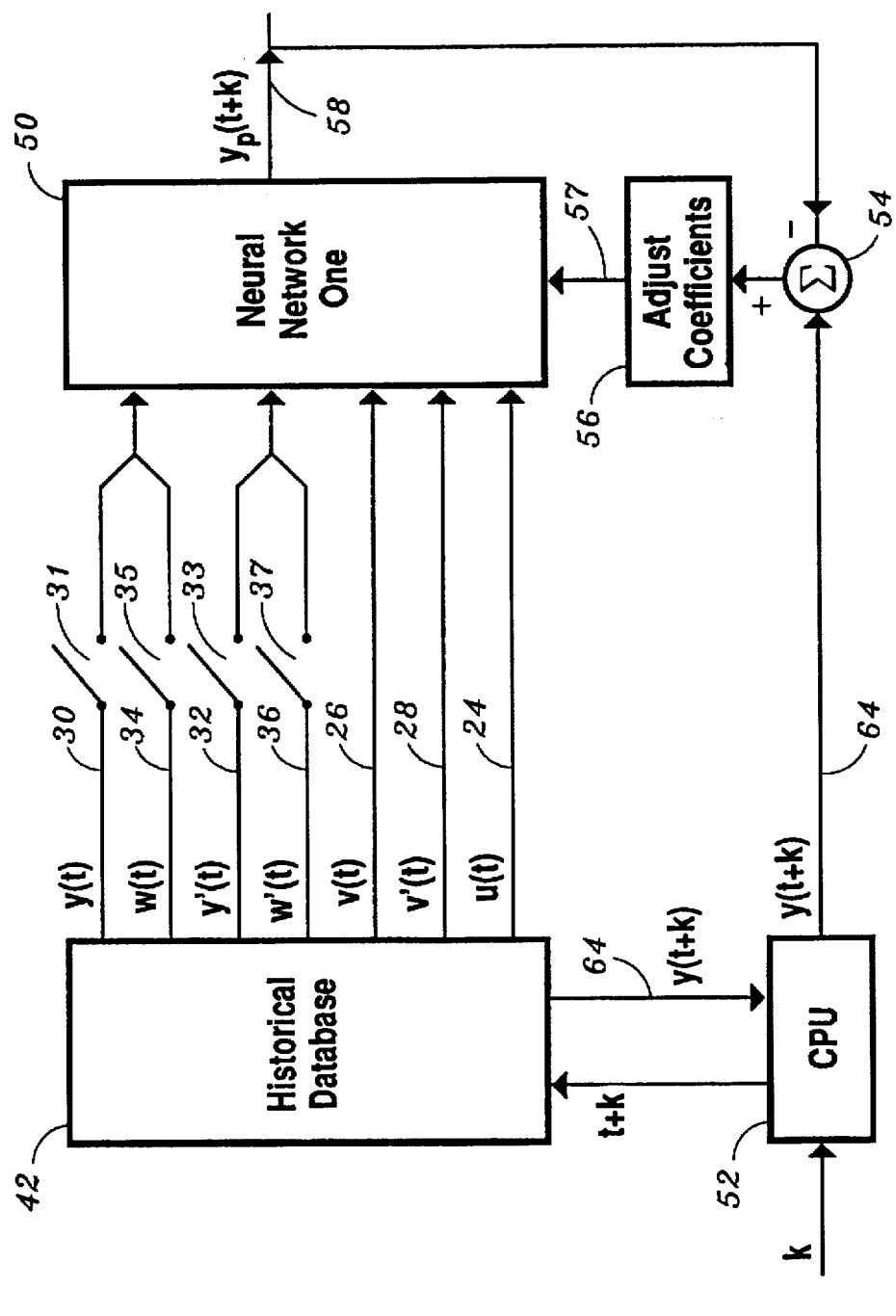
FIG. 3 depicts the operation of training a first neural network as a prediction model.

FIG. 3 depicts the second step of the preparation phase where neural network one is trained to serve as a prediction model producing the function, $y_p(t+k)$, which computes the predicted controlled variables advanced by several future time steps, based on the historical data. Neural network one can be trained in accordance with any of the standard neural network training methods. FIG. 3 illustrates training neural network one with the well-known back propagation scheme.

Typically, a back propagation network consists of nodes arranged in layers and passes data through weighted connections. An input layer receives input vectors, such as measured data values, used for training the network. The middle and output layers both actively process the input data producing the network's results in the output layer. The network learns by changing the values of the weights or coefficients. A node in the hidden and output layer typically multiplies each input by its coefficient, sums the products, then a hidden layer node passes the sum through a nonlinear transfer function to produce a result.

During training, the network passes each input value through the hidden layer to the output layer to generate an output node containing a predicted output. It then compares the actual value with the predicted value. The difference, which represents the output layer error, is passed back to the network where each hidden node calculates the weighted sum of the back propagated errors to find its contribution to the known output errors. After each hidden and output node finds its error value, it adjusts its coefficients to reduce the error.

Referring to FIG. 3, neural network one, 50, is trained with a vector of data at each time step t in the process to produce predicted controlled variables at several future time steps. The t values can be chosen such that there can be at least two samples for each period of the highest significant frequency of the process. The future time steps are herein denoted as k, which can be several positive integer values representing time steps that will capture the important dynamics of the process. For example, there can be five k values consisting of time steps 1, 2, 4, 8, 16 which logarithmically span a time horizon.

The actual controlled variable, y(t+k), 64, is selected from the controlled variables stored in the historical data base, 42 and compared with the predicted controlled variables at each of the time steps k are selected, $y_{p1}(t+k_1)$ . . . $y_{p1}(t+k_q)$ to $y_{pn}(t+k_1)$ . . . $y_{pn}(t+k_q)$, in order to train the neural network.

Neural network one, 50, consists of an input layer, at least one hidden layer, and an output layer (all not shown). Neural network one in this aspect of the invention is embodied as a special purpose processor although it can be a software module running on a general purpose computer. The following inputs from the historical data base, 42, can be applied to the input layer: a vector of n manipulated variables 24 ($u_1(t)$ . . . $u_n(t)$); a vector of n controlled variables 30 ($y_1(t)$ . . . $y_n(t)$); a vector of n derivatives of the controlled variables 32 ($y_1'(t)$ . . . $y_n'(t)$); a vector of m measured load variables 26 ($v_1(t)$ . . . $v_m(t)$); and a vector of m derivatives of the measured load variables 28 ($v_1'(t)$ . . . $v_m'(t)$). (Inferential variables 34 and their derivatives 36 are shown in FIG. 2 for illustration purposes only and do not imply that they need to be present for this embodiment to work). In order for neural network one to receive controlled variable inputs, 30, switch 31 is closed. Likewise, for the derivative of the controlled variable, 32, Switch 32 is closed in order for these inputs to be transmitted to neural network one. From these inputs, the network computes a function which calculates predicted controlled variable, $y_p(t+k)$, 58, which is compared with the actual value, y(t+k), 64. The difference or error between these two values is determined at summation circuit 54 and transferred to processor 56 where the coefficients or weights, 57, are adjusted to reduce the error. These coefficients, 57, are then transmitted to neural network one. This process is repeated until the errors between calculated predicted controlled variables, 60, and the actual values, 64, are minimized.

Thus, neural network one or the prediction model can be expressed mathematically as follows:

$$y_p(t+k)=f\{u(t), y(t), y'(t), v(t), v'(t)\}. \tag{1}$$

Accordingly, neural network one can be trained with concurrent inputs at time step t and the process output at time step t+k to produce the function which will compute the predicted controlled variables at a future time step t+k.

STEP THREE

Figure 4:
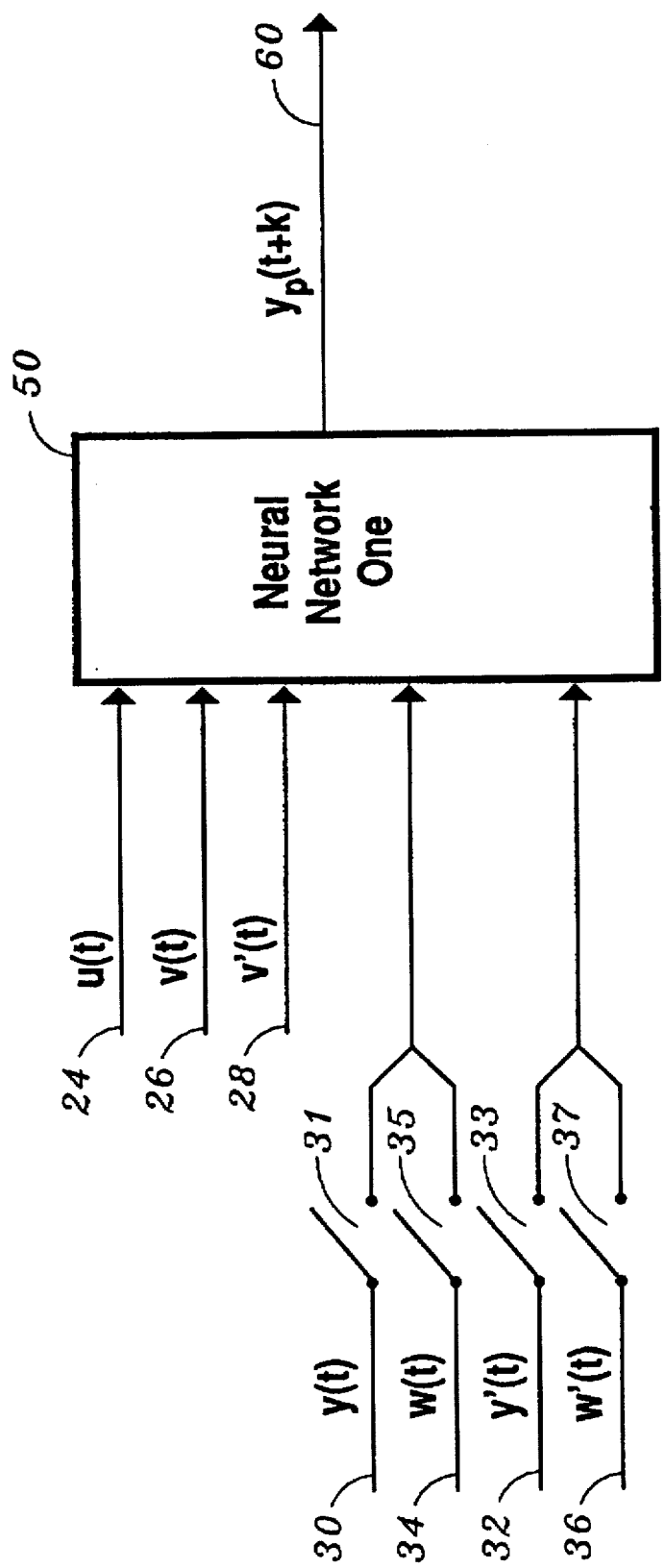
FIG. 4 depicts the operation of applying the first neural network to produce controlled variables at future time steps.

The third step of the preparation phase, as illustrated in FIG. 4, applies neural network one to produce a vector of predicted controlled variables 60 advanced by each of the k values for each time step t in the process. For example, at time step t, where there are n manipulated and controlled variables, and m measured load variables, neural network one 50 can be applied with a vector of n manipulated variables, u(t), 24, a vector of n controlled variables, y(t), 30, transmitted by closing switch 31, and their derivatives, y'(t), 32, transmitted by closing switch 33, a vector of m measured load variables, v(t), 26, and their derivatives, v'(t), 28. Neural network one will produce n*q predicted controlled variables, $y_{p1}(t+k_1) \ldots y_{p1}(t+k_q)$ to $y_{pn}(t+k_1) \ldots y_{pn}(t+k_q)$, for each of the n controlled variables, and for each of the q values of k. Predicted controlled variables 60 can be used further to determine the optimum prediction times and to determine the predicted controlled variables as advanced by the optimum prediction time.

STEP FOUR

Figure 5:
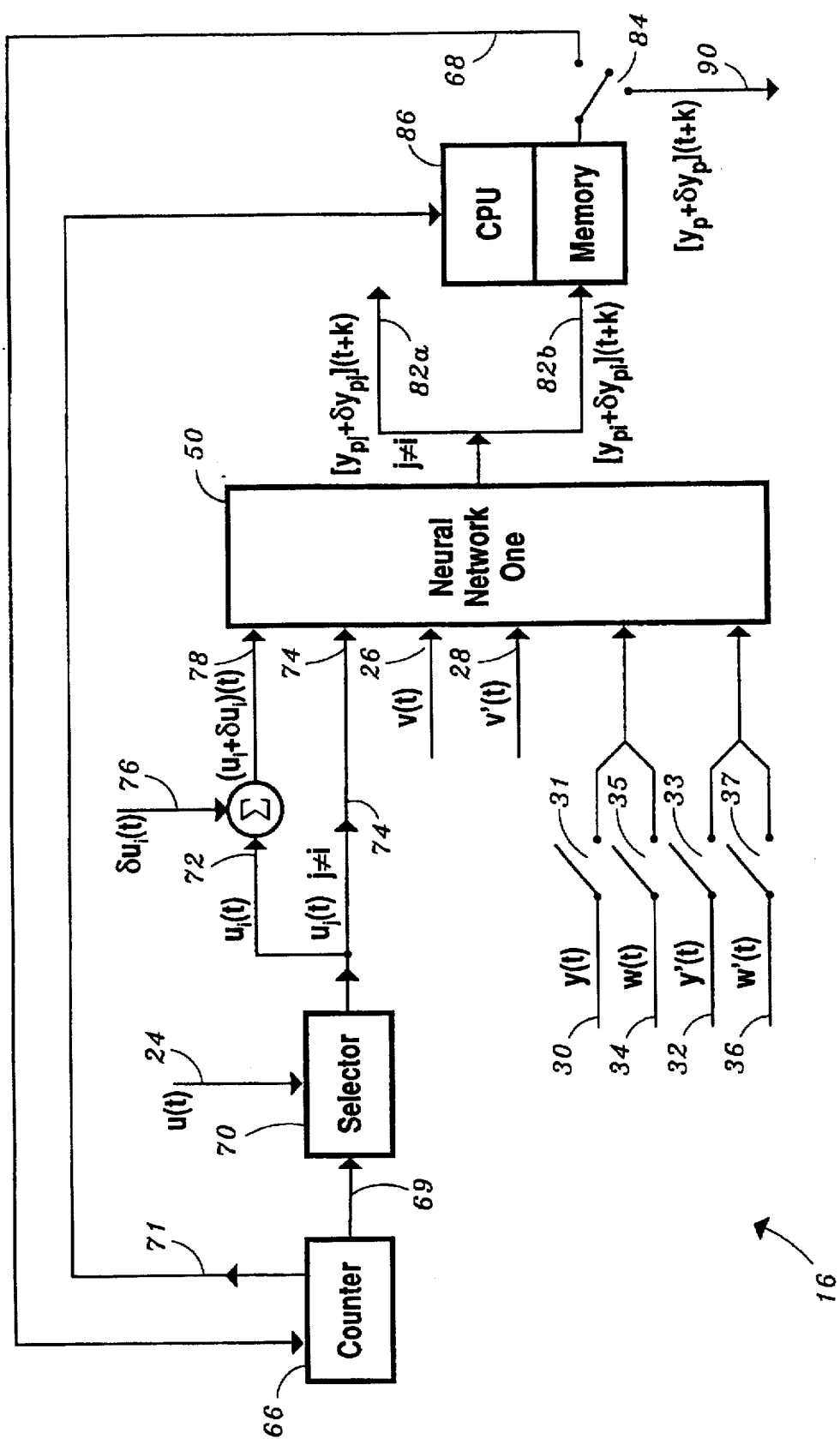
FIG. 5 depicts the operation of computing the sensitivity of the predicted controlled variables to the manipulated variable inputs.

The fourth step of the preparation phase is depicted in FIG. 5 where processor 16 is used to determine the sensitivity of the controlled variables to a change made to its paired manipulated variable. For example, neural network one can be applied with a change in the i-th manipulated variable input, $\delta u_i$, 76, producing a corresponding change in the i-th predicted controlled variable, $y_{pi}+\delta y_{pi}$, 82. The function of this sensitivity processor can be expressed mathematically for the i-th u,y pair as follows:

$$[y_{pi}+\delta y_{pi}](t+k)=f\{u_i(t)+\delta u_i, u_j(t), y(t), y'(t), v(t), v'(t)\}, \text{ where } j \text{ is not equal to } i. \quad (2)$$

Referring to FIG. 5, the processor can be applied, for each time step t, n times, once for each of the n manipulated variable. Counter 66 is initialized to one and is iteratively incremented as each manipulated variable is processed. Counter 66 generates signal 69 which indicates the particular manipulated variable currently being processed. Selector 70 receives a vector of manipulated variables, u(t), 24, and generates two output signals: $u_i(t)$ which is the corresponding manipulated variable of the signal 69; and $u_j(t)$, for j not equal to i, or the remaining manipulated variables. Neural network one can then be applied with manipulated variable, $u_i(t)$, altered by a value, $\delta u_i$, 76, producing $(u_i+\delta u_i)(t)$, 78, with the remaining n−1 manipulated variables, $u_j(t)$, 74, unchanged. The value, $\delta u_i$, can be an arbitrary value representing a small change that is applied to $u_i$, which can be as small as 1% or 2% of the manipulated variable $u_i$. The neural network also receives the following additional inputs from the historical data base: a vector of n derivatives of the controlled variables 32 ($y_1'(t) \ldots y_n'(t)$), transmitted by closing switch 31; a vector of n controlled variables 30 ($y_1(t) \ldots y_n(t)$), transmitted by closing switch 31; a vector of m measured load variables 26 ($v_1(t) \ldots v_m(t)$); and a vector of m derivatives of the measured load variables 28 ($v_1'(t) \ldots v_m'(t)$). These inputs are applied to neural network one, 50, producing predicted controlled variables, 82. The i-th predicted controlled variables 82b are stored in the memory of CPU 86. The other predicted controlled variables for j not equal to i, 82a, are not needed for determining the i-th optimum prediction time and, hence, can be discarded. The process continues for the remaining manipulated variables when switch 84 is closed thereby enabling signal 68 to increment counter 66. Upon completion of all the manipulated variables, when the counter index is greater than n, signal 71 is transmitted to CPU 86 which opens switch 84 thereby producing all the i-th stored controlled variables, 90 $[y_{p1}+\delta y_{p1}](t+k_1) \ldots [y_{pn}+\delta y_{pn}](t+k_q)$ to $[y_{pn}+\delta y_{pn}](t+k_1) \ldots [y_{pn}+\delta y_{pn}](t+k_q)$. The stored controlled variables, 90, are herein referred to as the sensitivity controlled variables. These sensitivity controlled variables are then used further for determining the optimum prediction times.

STEP FIVE

Referring to FIG. 1, in the fifth step, processor 18 computes the optimum prediction time, $\hat{k}_i(t)$, for each $u_i, y_i$ pair. The i-th optimal prediction time is the k value where the largest positive or smallest negative change in the predicted controlled variable $\delta y_{pi}(t+k)$ occurs with respect to k for the given change, $\delta u_i$, in its paired manipulated variable. This determination is made by processor 18 in a series of steps which starts with the change in the predicted controlled variables at each of the k values, $\delta y_{pi}(t+k)$, and progressively searches for the optimum change (largest positive or smallest negative value) $\delta y_{pi}(t+\hat{k}(t))$, from which the optimum k is interpolated. The optimum k, $\hat{k}_i(t)$, is a real (non-integer) positive number.

The determination of the optimum prediction time can be made by either one of two methods. In the first embodiment, which is the preferred method, the greatest difference in the predicted controlled variables as a result of the change made to its paired manipulated variables is used as the basis for determining the optimum prediction time. This greatest difference can be either the largest positive or the smallest negative value. In the second embodiment, the greatest rate of change in the predicted controlled variable as a result of the change made to its paired manipulated variable is used as the basis for determining the optimum prediction time.

Figure 6:
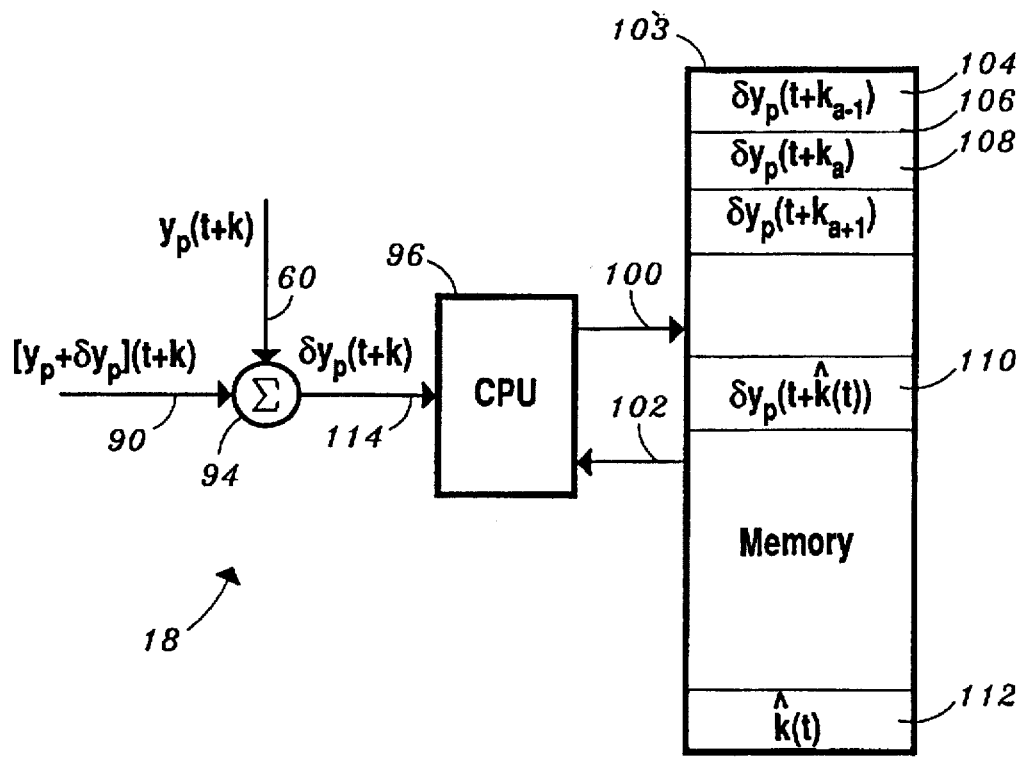
FIG. 6 depicts the operation of computing the optimum prediction times in accord with the first determination embodiment.

Referring to FIG. 6, in the first embodiment, the determination of the optimum prediction time can be made by processor 18 in the following manner. At summation circuit 94, the difference in the predicted controlled variable, $\delta y_{pi}$, as a result of the change to its paired manipulated variable, $\delta u_i$, is computed. It is simply the difference between the predicted controlled variable, 60, and the sensitivity controlled variable, 90. This difference, 114, can be expressed mathematically as:

$$\delta y_{pi}(t+k_j)=[y_{pi}+\delta y_{pi}](t+k_j)-y_{pi}(t+k_j) \quad (3)$$

for j=1 to q, i=1 to n and is herein referred to as the change variable or as the change in the predicted controlled variable.

Figure 7:
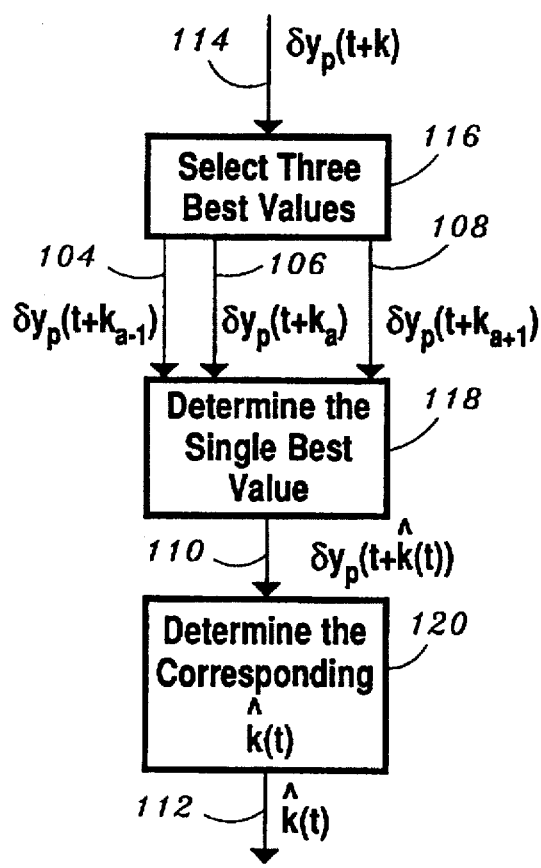
FIG. 7 depicts the steps used in computing the optimum prediction times in accord with the first determination embodiment.
Figure 8:
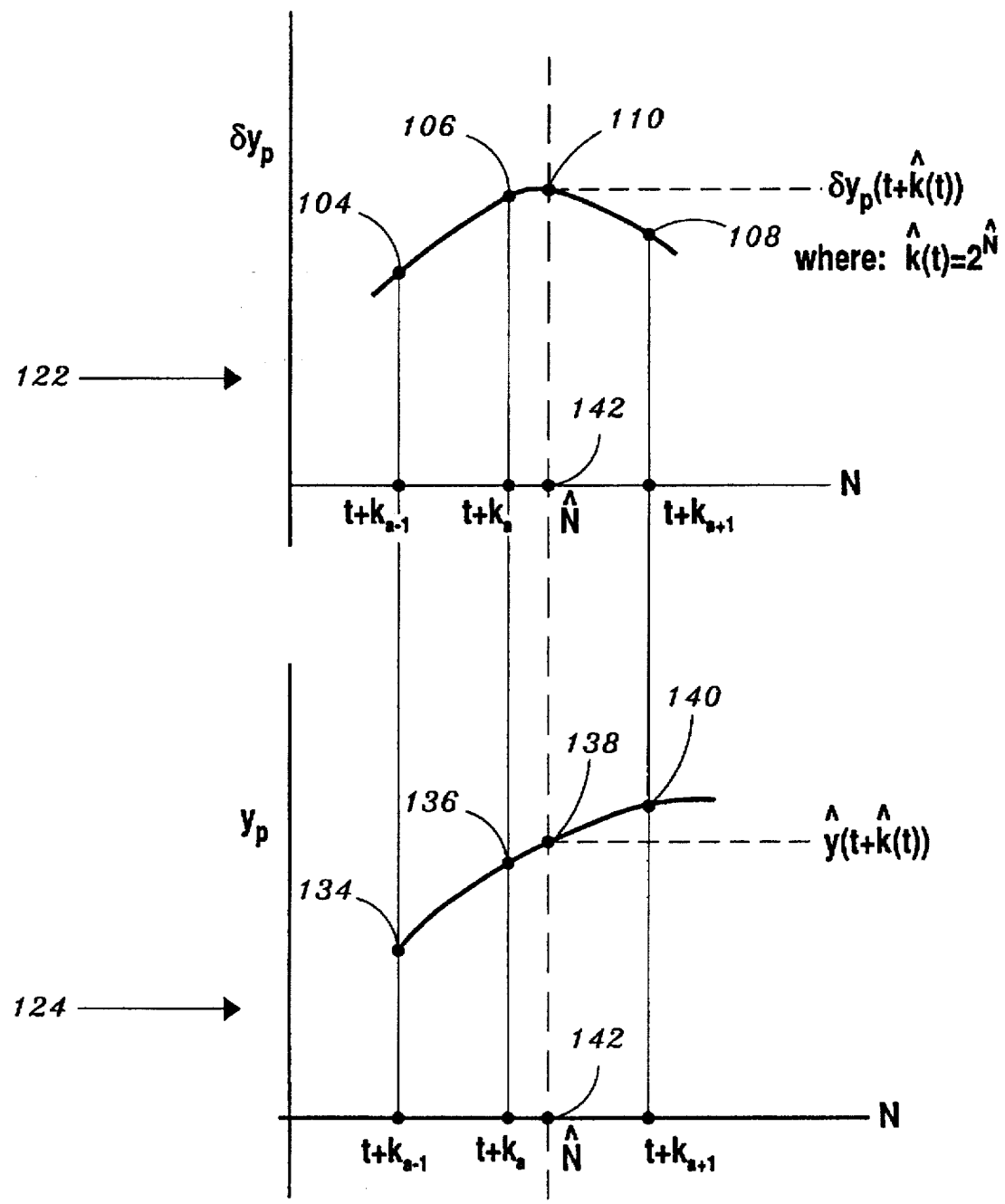
FIG. 8 is a graph illustrating the maximization operation shown in FIGS. 6, 7, 10, and 11.
Figure 9:
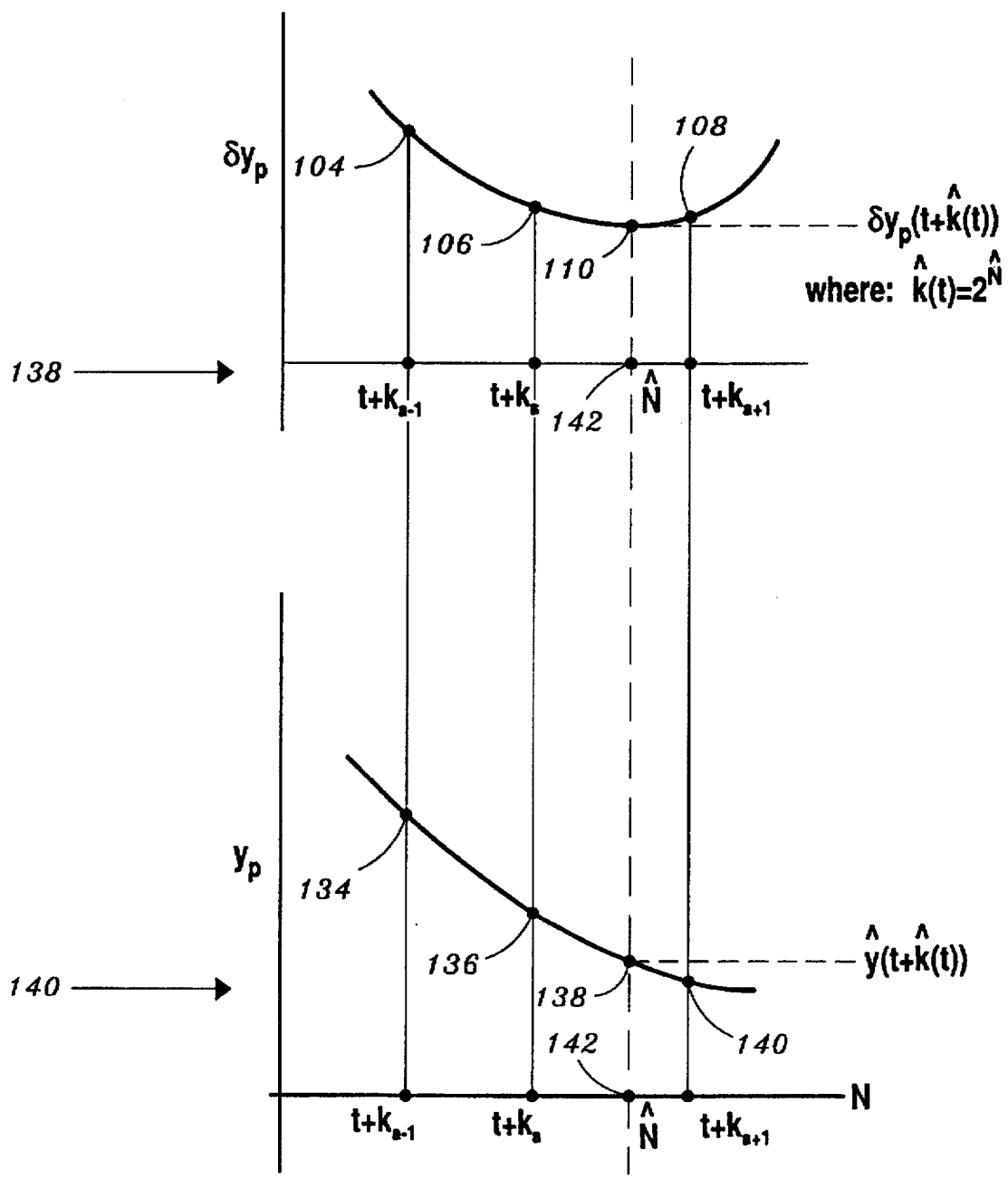
FIG. 9 is a graph illustrating the minimization operation shown in FIGS. 6, 7, 10 and 11.

Next, the three largest consecutive positive or smallest negative values, 104, 106, and 108, of the change variables 114, are selected. These values are used to compute the maximum positive (maximum case) or minimum negative (minimum case) change in the predicted controlled variable, $\delta y_{pi}(t+\hat{k}(t))$, 110. Lastly, the corresponding $\hat{k}_i(t)$ value is determined. These functions are graphically illustrated in FIGS. 7, 8, and 9. The maximum case scenario is where the change in the predicted controlled variable yields the three largest positive consecutive values and the minimum case scenario yields the three smallest negative consecutive values. FIG. 8 illustrates the maximum case scenario and FIG. 9 illustrates the minimum case scenario. These computations may be determined as follows for the case where the k values are integer powers of 2.

11

Referring to FIG. 6, CPU 96 receives change variables, 114, and computes the optimum prediction times, $\hat{k}(t)$, 112 using associated memory 103 to store intermediate values used in its calculation and the optimum prediction times. FIG. 7 illustrates the steps that CPU 96 takes to determine the optimum prediction times. Referring to FIGS. 7, 8, and 9, CPU 96, selects, in step 116, the three largest positive or the smallest negative values, 104, 106, 108, from change variables, 114, which are denoted herein as $\delta y_{pi}(t+k_{a-1})$, $\delta y_{pi}(t+k_a)$, and $\delta y_{pi}(t+k_{a+1})$ respectively, where N=$\log_2$ k and k=1,2,4,8,16, . . . , N=0,1,2,3,4, . . .

In step 118, the maximum positive or minimum negative change in the predicted controlled variable $\delta y_{pi}(t+\hat{k}(t))$ is determined. This can be computed by fitting a parabola (122 in FIG. 8 for the maximum case or 138 in FIG. 9 for the minimum case) using the three values at time step t and determining the maximum or minimum value in the parabola. This computation can be expressed mathematically as follows:

$$\delta y_{pi}(t+\hat{k}(t))=\delta y_{pi}(t+k_a)+[\delta y_{pi}(t+k_{a+1})-\delta y_{pi}(t+k_{a-1})](\hat{N}-N_a)/2+[\delta y_{pi}(t+k_{a+1})-2\delta y_{pi}(t+k_a)+\delta y_{pi}(t+k_{a-1})](\hat{N}-N_a)^2/2. \quad (4)$$

The maximum or minimum value on this parabola occurs at $\hat{N}$, 142, where $$\hat{N}=N_a+[\delta y_{pi}(t+k_{a+1})-\delta y_{pi}(t+k_{a-1})]/[2(2\delta y_{pi}(t+k_a)-\delta y_{pi}(t+k_{a+1})-\delta y_{pi}(t+k_{a-1}))]. \quad (5)$$

Next in step 120, the optimum prediction time is determined as the point at which $\hat{N}$ occurs, 142, $\hat{k}_i(t)=2^{\hat{N}}$. If $\hat{k}_i(t)$ is calculated to be less than 1, $\hat{k}_i(t)$ is set equal to 1. This indicates that control performance could be improved by reducing the controlled variable sampling interval. The output of step 120 is a vector of n optimum prediction times, $\hat{k}$ (t), 112, which are stored in memory 103, and are used to train the second neural network.

Figure 10:
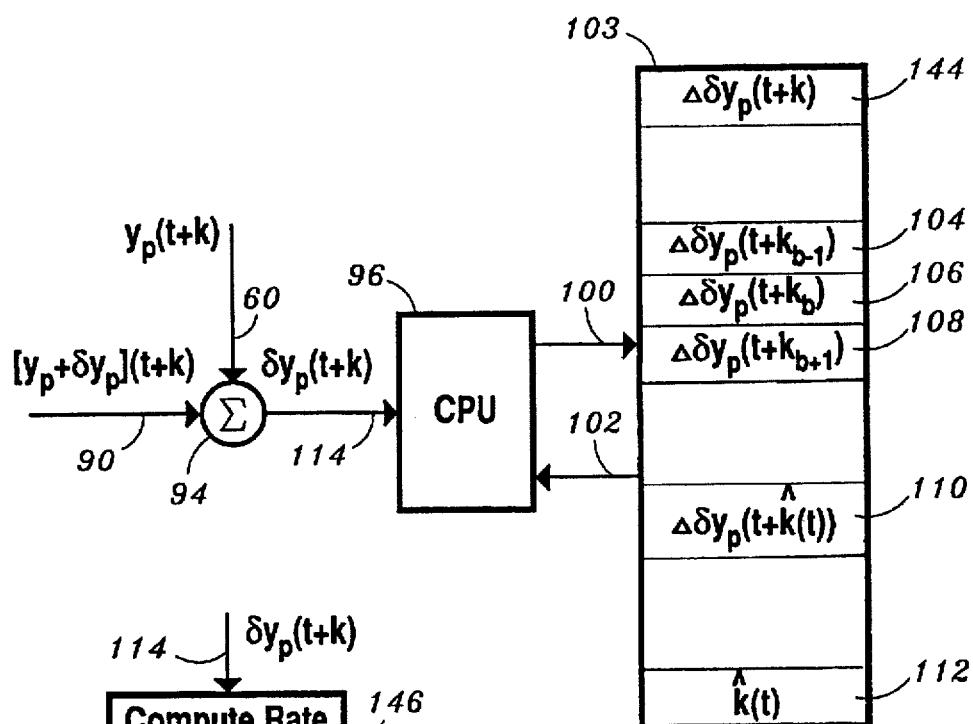
FIG. 10 depicts the operation of determining the optimum prediction times in accord with the second determination embodiment.
Figure 11:
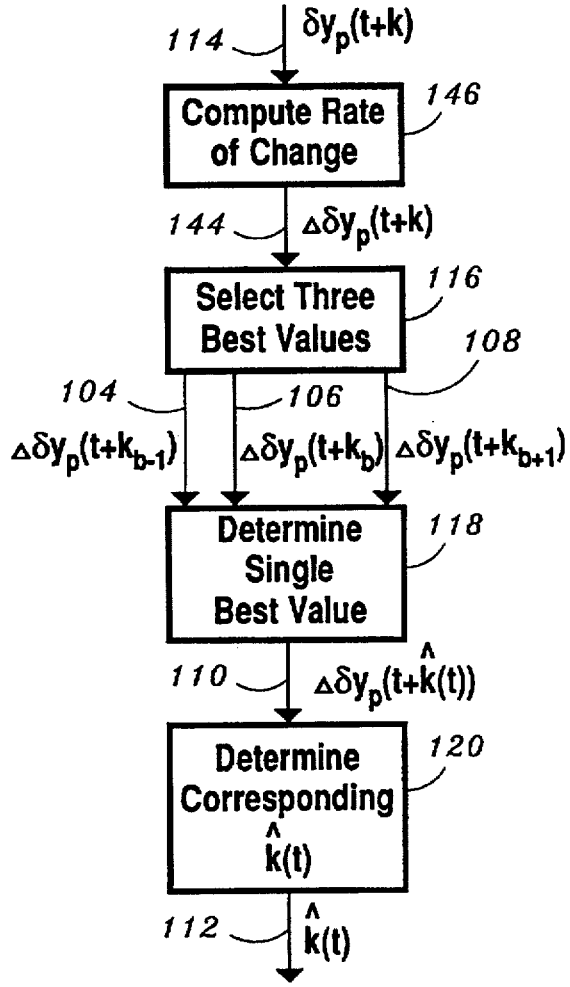
FIG. 11 depicts the steps used in determining the optimum prediction times in accord with the second determination embodiment.

Alternatively, the computation of the optimum prediction times can be determined as in the second determination embodiment which is illustrated in FIGS. 10 and 11. This method is similar to the method described in the first determination embodiment except for an additional step, step 146, which determines the rate of change from the change in the predicted controlled variables.

Referring to FIGS. 10 and 11, the determination of the optimum prediction time can be made by processor 96 which uses memory 103 to store the intermediary values, 104, 106, 108, 110, and 144, and the optimum prediction times, $\hat{k}(t)$, 112. Processor 96 proceeds in the following manner. In step 146, the rate of change in the change variables 114 for all k values is determined. This rate of change can be determined by calculating the difference between two $\delta y_{pi}$ values which have consecutive k values. This rate of change is denoted by $\Delta\delta y_p(t+k_b)$ and can be expressed mathematically as:

$$\Delta\delta y_{pi}(t+k_b) = \delta y_{pi}(t+k_{a+1}) - \delta y_{pi}(t+k_a) = \quad (6)$$
$$(y_{pi} + \delta y_{pi})(t+k_{a+1}) - y_{pi}(t+k_{a+1}) - (y_{pi} + \delta y_{pi})(t+k_a) + y_{pi}(t+k_a),$$

where $k_a$ and $k_{a+1}$ are two consecutive k values, and $k_b$ is the arithmetic or geometric mean of $k_a$ and $k_{a+1}$. The output of step 146 is a vector, 144, of n*(q-1) rates of change denoted as $\Delta\delta y_{p1}(t+k_1) \ldots \Delta\delta y_{p1}(t+k_q)$ to $\Delta\delta y_{pn}(t+k_1) \ldots \Delta\delta y_{pn}(t+k_q)$.

Steps 116, 118, and 120 are similar as in the first embodiment. Step 116, selects the three best, smallest negative or largest positive values, $\Delta\delta y_{pi}(t+k_{b-1})$, 104, $\Delta\delta y_{pi}(t+k_b)$, 106, $\Delta\delta y_{pi}(t+k_{b+1})$, 108; step 118 determines the single best value through parabolic interpolation producing $\Delta\delta y_p(t+\hat{k}(t))$, 110;

12 and then step 120 determines the corresponding $\hat{k}(t)$, 112. The output from processor 96, in either embodiment, is a vector of optimum prediction times, 112, $\hat{k}(t)$, which is stored in memory 103 and used to train a second neural network.

STEP SIX

Figure 12:
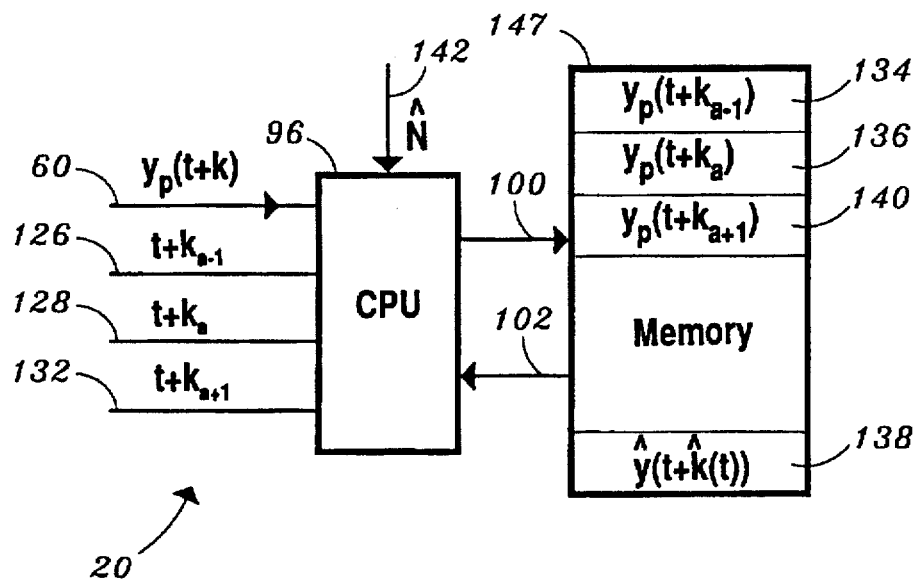
FIG. 12 depicts the interpolation operation as used in the preferred practice.
Figure 13:
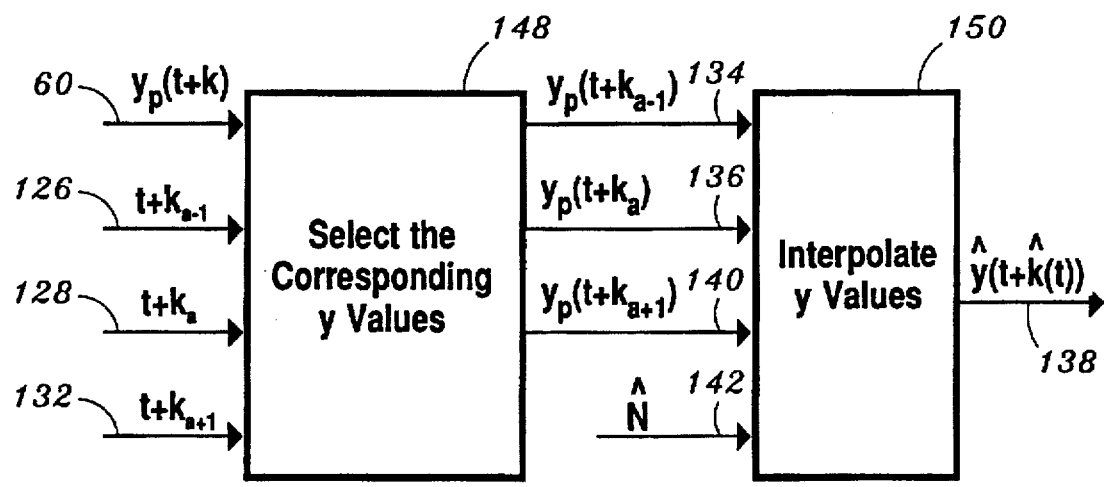
FIG. 13 depicts the steps used in determining the predicted controlled variables as advanced by the optimum prediction times.

Referring to FIG. 12 and 13, the sixth step, uses processor 96 to determine the corresponding value of the predicted controlled variable at the optimum prediction time, $\hat{y}_i(t+\hat{k}_i(t))$, 138, which is stored in memory 147. Processor 96 receives as inputs, predicted controlled variables, $y_p(t+k)$, 60, the three best k values, $t+k_{a-1}$, 126, $t+k_a$, 128, and $t+k_{a+1}$, 132, and proceeds in the following fashion. First, the controlled variables at the three best k values, $t+k_{a-1}$, $t+k_a$, $t+k_{a+1}$ are selected from the set of predicted controlled variables 60 produced by neural network one. This selection is made in step 148 and the controlled variables chosen are denoted as 134, $y_{pi}(t+k_{a-1})$, 136, $y_{pi}(t+k_a)$, and 140, $y_{pi}(t+k_{a+1})$. Next, in step 150, the corresponding predicted controlled variables at the optimum prediction times is computed. Referring to graph 124 in FIG. 8 and graph 140 in FIG. 9, the optimum predicted controlled variables is computed by plotting a parabola using the three predicted controlled variables 134, 136, 140, and interpolating the $y_{pi}$ value that corresponds to the optimum $\hat{k}$ value at $\hat{N}=\log_2\hat{k}$. The corresponding value of $y_{pi}$ is $\hat{y}_i(t+\hat{k}_i(t))$, 138, where $$\hat{y}_i(t+\hat{k}_i(t))=y_{pi}(t+k_a)+0.5[y_{pi}(t+k_{a+1})-(y_{pi}(t+k_{a-1})+(y_{pi}(t+k_{a+1})-2y_{pi}(t+k_a)+y_{pi}(t+k_{a-1}))(\hat{N}-(t+k_a))](\hat{N}-(t+k_a)). \quad (7)$$

Referring to FIGS. 12 and 13, the output of processor 96 at step 150 is the predicted controlled variables as advanced by the optimum predicted times 138, $\hat{y}_1(t+\hat{k}_1(t)) \ldots \hat{y}_n(t+\hat{k}_n(t))$. This output can then be used to train the second neural network.

STEP SEVEN

Figure 14:
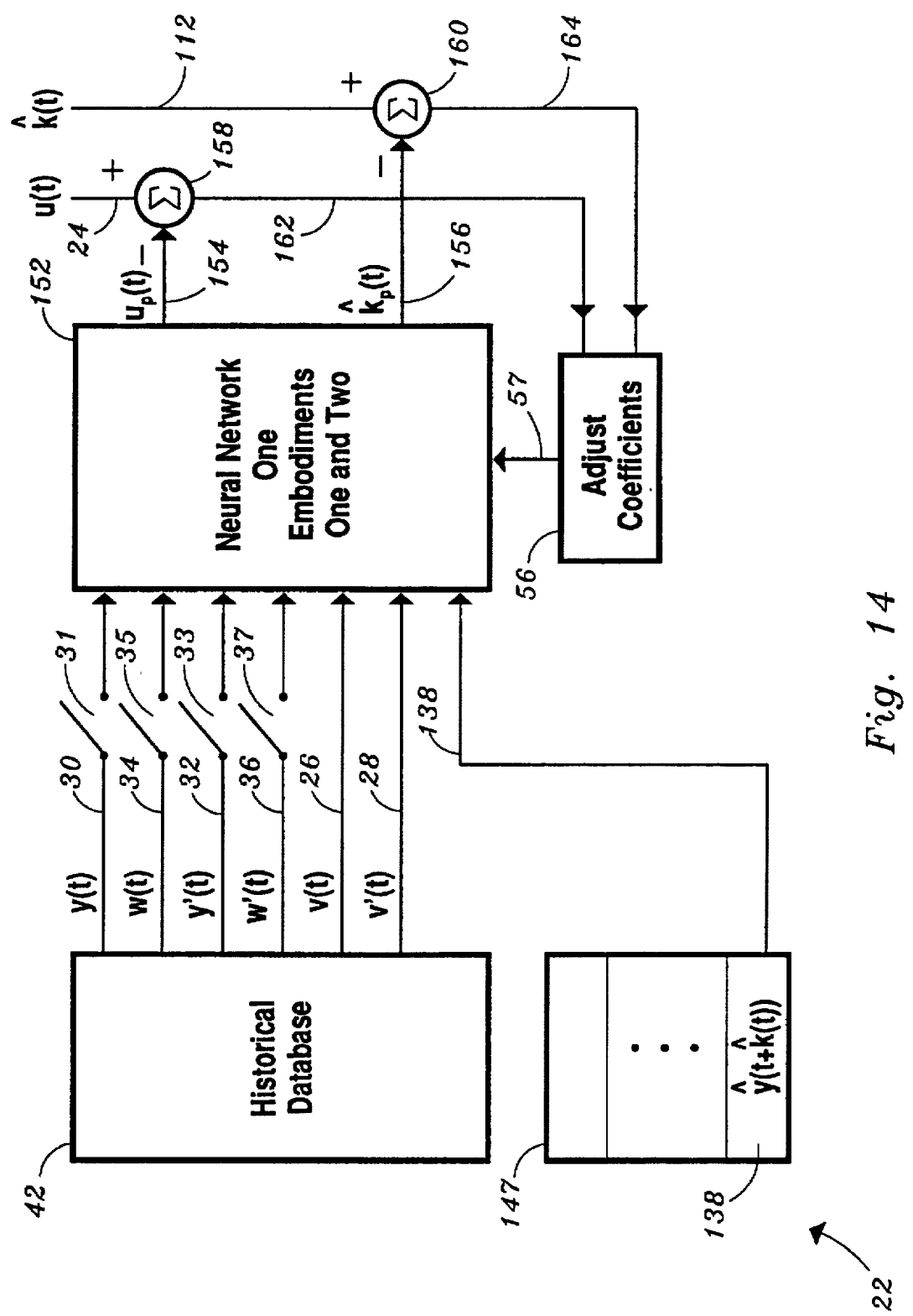
FIG. 14 depicts the operation of training a second neural network, as used in the first and second embodiment, to output the manipulated variables and optimum prediction times on certain inputs.

The final step is to train a second neural network which may serve as a process controller. Referring to FIG. 14, processor 22 trains neural network two to produce the function which will compute the optimum prediction times and the appropriate manipulated variables which may be used to control the process. FIG. 14 illustrates the method of training the neural network through back propagation which is similar to the manner in which neural network one was trained in FIG. 3. The inputs that can be used to train this network are as follows: a vector of n controlled variables, 30, ($y_1(t) \ldots y_n(t)$), selected by closing switch 31; a vector of n derivatives of the controlled variables, 32, ($y_1'(t) \ldots y_n'(t)$), selected through switch 33; a vector of m measured load variables, 26, ($v_1(t) \ldots v_m(t)$); a vector of m derivatives of the measured load variables, 28, ($v_1'(t) \ldots v_m'(t)$); and a vector of n optimum predicted controlled variables, 138, ($\hat{y}_1(t+\hat{k}_1(t)) \ldots \hat{y}_n(t+\hat{k}_n(t))$) which are in memory 147. (Inferential variables 34 and their derivatives 36 are shown in FIG. 14 for illustration purposes only and do not imply that they need to be present for this embodiment to work). From these inputs, neural network 152 computes a calculated manipulated variable, $u_p(t)$, 154, and a calculated optimum prediction time, $\hat{k}_p(t)$, 156. Calculated manipulated variable, $u_p(t)$, 154, is compared with the actual manipulated variable, u(t), 24 and the difference between the two values, 162, is determined by summation circuit 158. Similarly, the calculated optimum prediction time, $\hat{k}_p(t)$, 156, is compared with the actual optimum prediction time, $\hat{k}(t)$, 112, and the difference between the two values, 164, is determined by summation circuit 160. Both differences, 162 and 164, are transmitted to processor 56 where the coefficients, 57, are adjusted to reduce the error. Coefficients, 57, are then transmitted to neural network two. This process is repeated until the calculated optimum prediction times and manipulated variables equal the actual values.

Figure 17:
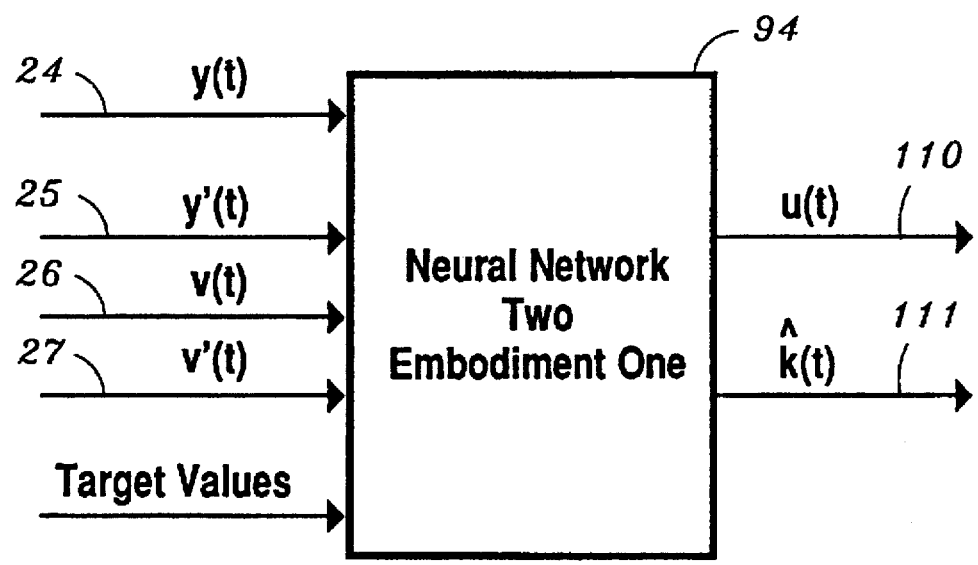
FIG. 17 illustrates the use of the neural network developed in the first embodiment.

Upon completion of this preparation phase, the resultant network, as illustrated in FIG. 17, can be used as a controller.

SECOND EMBODIMENT

The second embodiment produces a neural network which is trained with inferential measurements in place of the controlled variables. Inferential measurements represent an inferred approximation of the controlled variable at a faster sampling rate. The use of these measurements produces a network which when used as a controller is able to control at a faster rate than the sampling rate that the controlled variable is measured.

Figure 18:
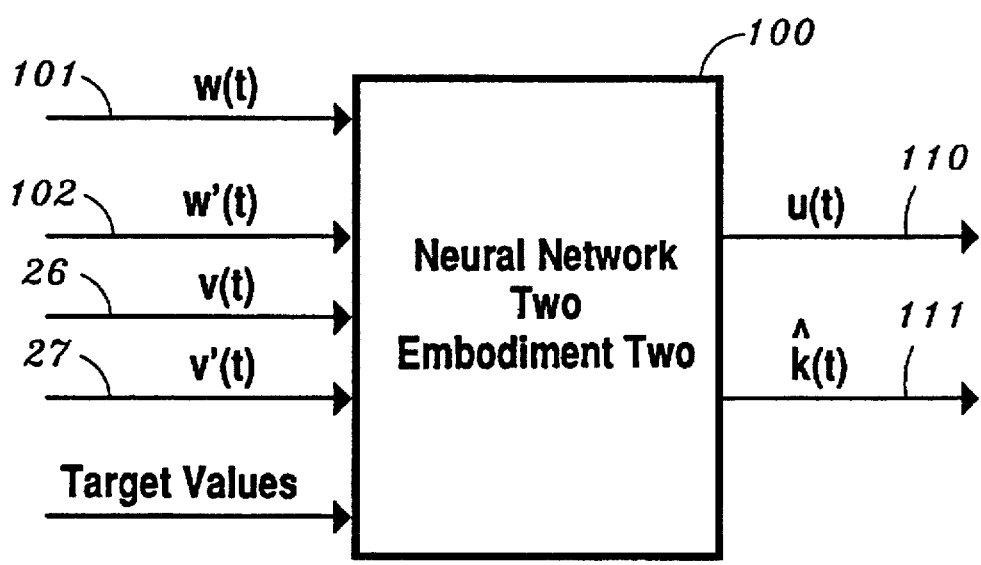
FIG. 18 illustrates the use of the neural network developed in the second embodiment.

The method of training the neural network produced in the second embodiment is identical to the method used in the first embodiment with the exception of replacing the controlled variables and their derivatives with the inferential measurements, w(t), and their derivatives, w'(t). CPU 40 which generates historical data base 42 as illustrated in FIG. 2 uses inputs 34 and 36 in lieu of inputs 30 and 32. Processor 12 which trains neural network one as illustrated in FIG. 3 uses the inferential measurements, w(t), 34 and their derivatives, w'(t), 36, as selected by switches 35 and 37 respectively, thereby replacing controlled variables 30, and its derivatives, 32, to produce predicted controlled variables 60. In FIG. 5, the sensitivity of the controlled variables to a change made to its paired manipulated variables is made by utilizing neural network one with inferential measurements, w(t), 34, and their derivatives, w'(t), 36, through switches 35 and 37, thereby replacing controlled variables, y(t), 30, and their derivatives, y'(t), 32. The optimum prediction time and the predicted controlled variable as advanced by the optimum prediction time is computed as in the first embodiment. The second neural network is trained as in FIG. 14 with the inferential measurements, w(t), 34, and their derivatives, w'(t), 36, through switches 35 and 37 thereby replacing the controlled variables, 30 and its derivatives, 32. The resultant network, as illustrated in FIG. 18, can be used as a controller.

THIRD EMBODIMENT

A third embodiment is used to train a different neural network two which will produce the optimum prediction times and the predicted controlled variables as advanced by the optimum prediction times. This neural network can be used for process experimentation or as part of a controller structure as described in copending application "A Method and Apparatus for Controlling Multivariable Nonlinear Processes".

Figure 15:
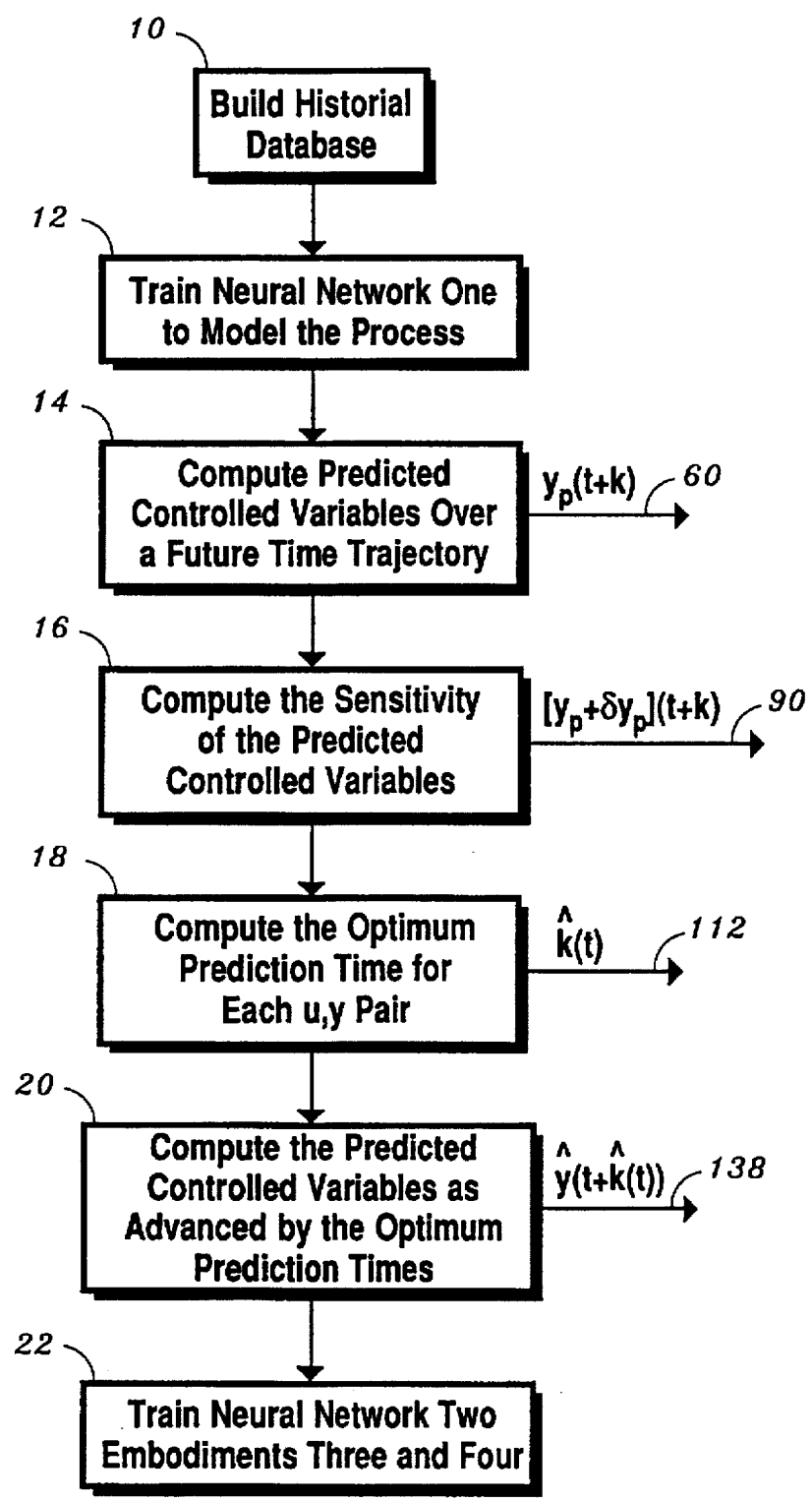
FIG. 15 is a flow chart illustrating the sequence of steps used in the third and fourth embodiments to train a neural network for use in a process control system.

The third embodiment is similar to the first embodiment encompassing some of the same steps. Referring to FIG. 15, this embodiment creates the historical data base as in FIG. 2, trains neural network one as FIG. 3, computes the predicted controlled variables as in FIG. 4, computes the sensitivity of the predicted controlled variables as in FIG. 5, computes the optimum prediction times for each u,y pair as in step 18, and computes the predicted controlled variable advanced by the optimum prediction time as in step 20. It then trains a different second neural network to produce the function that will compute the optimum prediction times and the predicted controlled variables as advanced by the optimum prediction times.

Figure 16:
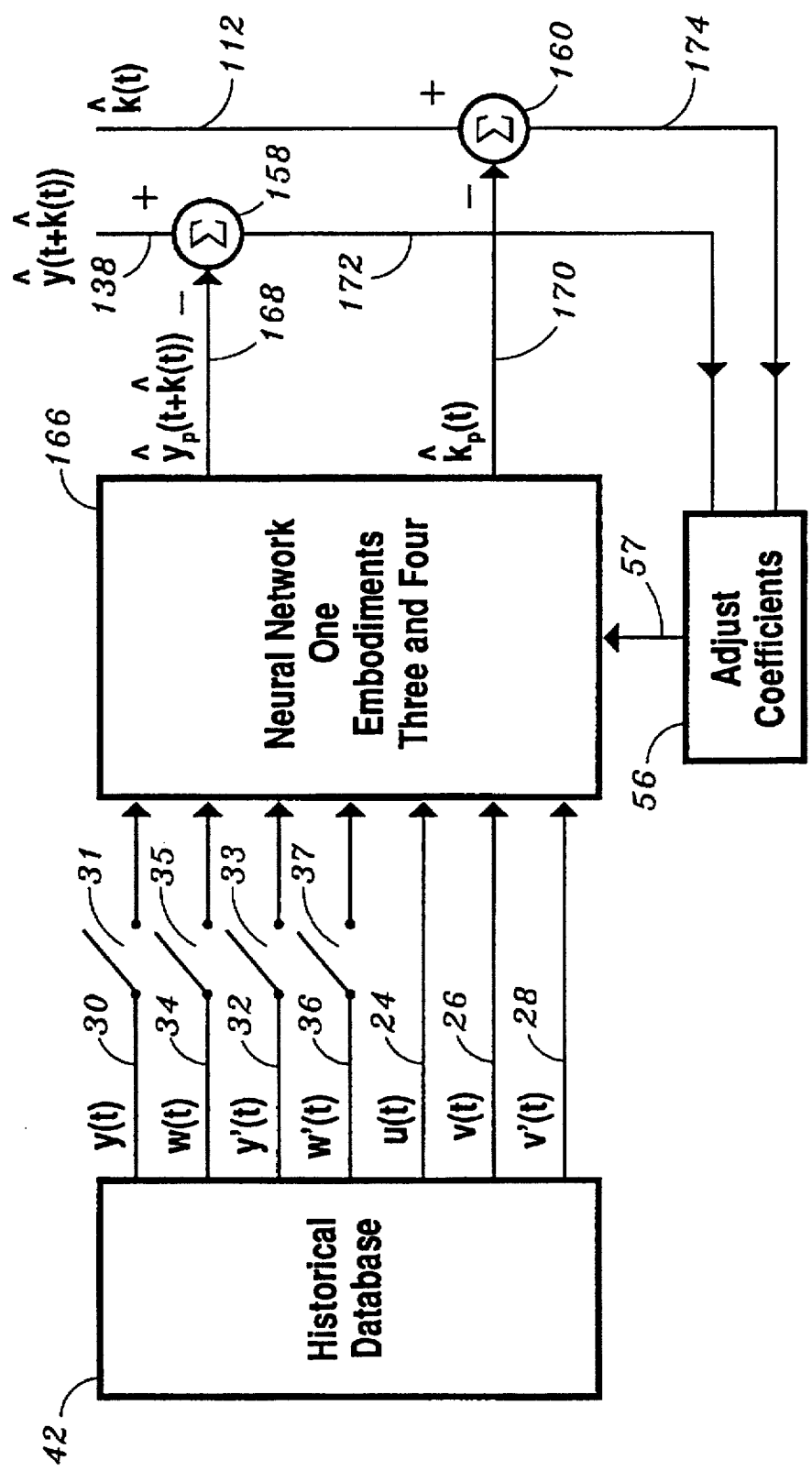
FIG. 16 depicts the operation of training a second neural network, as used in the third and fourth embodiments, to output the predicted controlled variables as advanced by the optimum prediction times and the optimum prediction times on certain inputs.

FIG. 16 illustrates training the second neural network through back propagation which is similar to the manner in which neural network one was trained in FIG. 14. The inputs that can be used to train the network are as follows: a vector of n derivatives of controlled variables, 32, $y_1'(t) \ldots y_n'(t)$, selected by closing switch 33; a vector of n manipulated variables, 24, $u_1(t) \ldots u_n(t)$; a vector of n controlled variables, 30, $y_1(t) \ldots y_n(t)$, selected by closing switch 31; a vector of m measured load variables, 26, $v_1(t) \ldots v_m(t)$; and a vector of m derivatives of measured load variables, 28, $v_1'(t) \ldots v_m'(t)$. From these inputs, neural network 166 computes calculated predicted controlled variables as advanced by the optimum prediction time, $\hat{y}_p(t+\hat{k}(t))$, 168, and a calculated optimum prediction time, $\hat{k}_p(t)$, 170. Calculated predicted controlled variables as advanced by the optimum prediction time, $\hat{y}_p(t+\hat{k}(t))$, 168, is compared with the actual value, $\hat{y}(t+\hat{k}(t))$, 138, and the difference between the two values, 172, is determined by summation circuit 158. Similarly, the calculated optimum prediction time, $\hat{k}_p(t)$, 170, is compared with the actual optimum prediction time, $\hat{k}(t)$, 112, and the difference between the two values, 174, is determined by summation circuit 160. Both differences, 172 and 174, are transmitted to processor 56 where coefficients, 57, are adjusted to reduce the error. Coefficients, 57, are then transmitted to neural network two. This process is repeated until the calculated predicted controlled variables as advanced by the optimum prediction times and the optimum prediction times equal the actual values.

Figure 19:
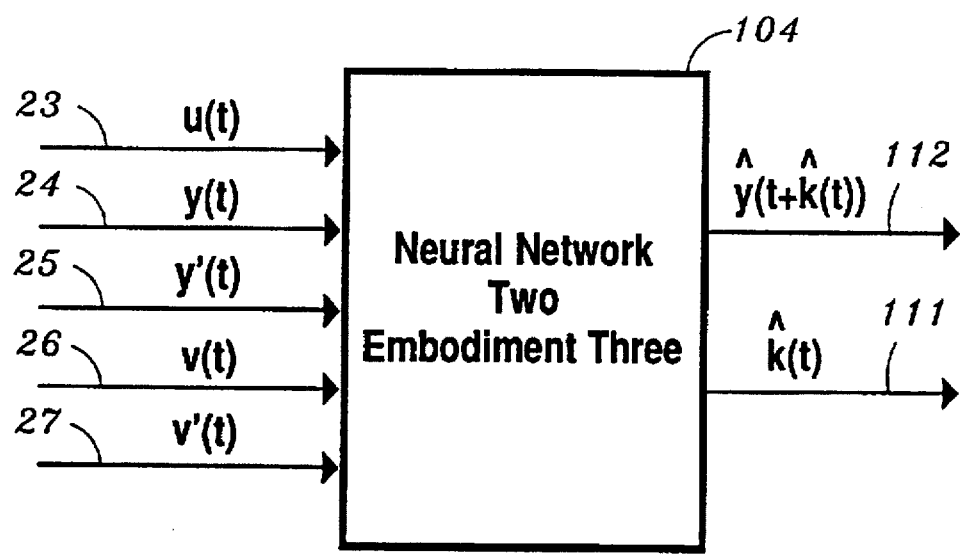
FIG. 19 illustrates the use of the neural network developed in the third embodiment.

Upon the completion of this training step, the resultant network, as illustrated in FIG. 19, can be used as shown for process experimentation or as part of a controller.

FOURTH EMBODIMENT

The fourth embodiment produces a neural network which is trained with inferential measurements in place of the controlled variables. Inferential measurements represent an inferred approximation of the controlled variable available at a faster sampling rate. The use of these measurements produces a network which when used as a controller is able to control at a faster rate than the sampling rate that the controlled variable is measured.

Figure 20:
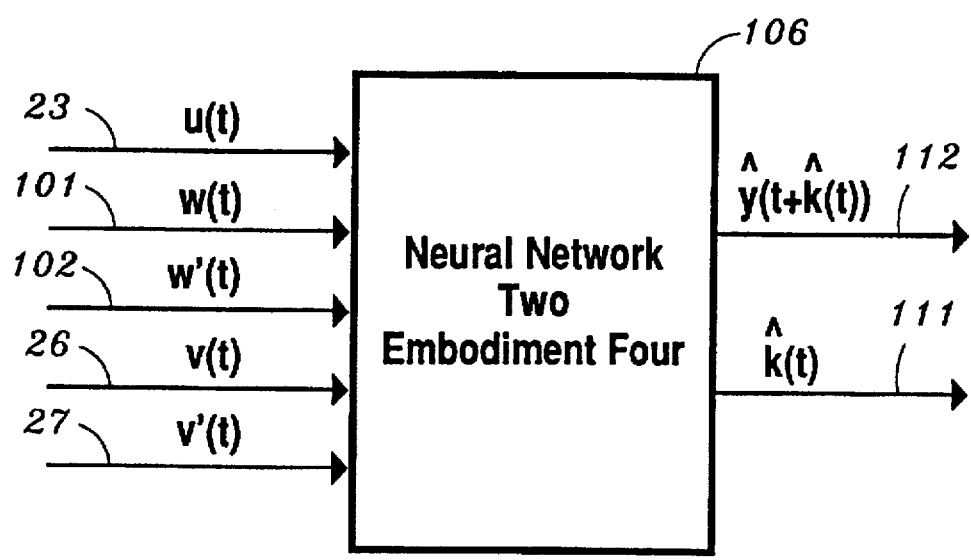
FIG. 20 illustrates the use of the neural network developed in the fourth embodiment.

The method of training the neural network produced in the fourth embodiment is identical to the method used in the third embodiment with the exception of replacing the controlled variables and their derivatives with the inferential measurements, w(t), and their derivatives, w'(t). CPU 40 which generates historical data base 42 is illustrated in FIG. 2 and uses inputs 34 and 36 in lieu of inputs 30 and 32. Processor 12 which trains neural network one as illustrated in FIG. 3, uses the inferential measurements, w(t), 34 and their derivatives, w'(t), 36, as selected by switches 35 and 37 respectively, thereby replacing controlled variables 30, and its derivatives, 32, to produce predicted controlled variables 60. In FIG. 5, the sensitivity of the controlled variables to a change made to its paired manipulated variables is made by utilizing neural network one with inferential measurements, w(t), 34, and their derivatives, w'(t), 36, through switches 35 and 37, thereby replacing controlled variables, y(t), 30, and their derivatives, y'(t), 32. The optimum prediction time and the predicted controlled variable as advanced by the optimum prediction time is computed as in the third embodiment. The second neural network is trained as in FIG. 16 with the inferential measurements, w(t), 34, and their derivatives, w'(t), 36, through switches 35 and 37 thereby replacing the controlled variables, 30 and its derivatives, 33. The resultant network, as illustrated in FIG. 20, can be used as part of a controller or for process experimentation.

SUMMARY

This disclosure presents a method and apparatus for training and optimizing a neural network to determine the optimum prediction time of a process as a basis for computing a manipulated variable for controlling the process, as in the first embodiment. In the second embodiment, a method and apparatus for training and optimizing a neural network to determine the optimum prediction time of a process as a basis for computing the predicted controlled variable as advanced by the optimum prediction time for indirectly controlling the process or for performing process experiments has also been disclosed.

These embodiments are flexible permitting variations from the preferred embodiments in order to suit various types of processes. For example, for some processes, the derivative action may not be warranted. In such cases, the derivatives of the controlled variables and the measured load variables may be eliminated. This may be desirable for a dominant dead time process or a process with large measurement noise.

Additionally, the network need not be trained with all the process inputs as described above. A subset of those previously mentioned may be used and additional inputs may be included as well. For example, the measured load variables may not be needed for those processes which are not subjected to major load disturbances.

It should be noted further that in all of the aforementioned embodiments, the function of the neural network can be performed by other data processing structures. Examples of such structures are, but not limited to, nonlinear function generator or characterizer, fuzzy logic processor, look-up tables, inferential logic machines, or by a processor utilizing a set of equations which would calculate the appropriate values for the signals generated.

The method of determining the optimum prediction time as providing the greatest sensitivity in the predicted controlled variable as a result of the small change made to its paired manipulated variable is not limited to the parabolic interpolation method described. Other mathematical techniques can be used.

Furthermore, the resultant neural network can be implemented in software, to be run on a computer system, in hardware through electronic circuitry, or as a hybrid system, partially implemented in software and partially in hardware.

Training and optimizing the neural network in this manner is beneficial for several reasons. Of importance is the selection of the inputs used to train the network. First, the network is trained with concurrent input data to predict the controlled variables with variable time delay. The use of the time derivative inputs and variable prediction times for the controlled variable incorporates the process's dynamics into the network and eliminates the need for additional delayed inputs. The use of the concurrent inferential measurements in place of controlled variable inputs gives the neural network the added advantage of being able to control at a faster rate than the controlled variable sampling rate. These improvements produce a network having a fast response when used as a controller. Second, the use of the measured load variable inputs gives the network the ability when used as a controller to compensate for these disturbances.

Third, the model is trained with concurrent and therefore independent inputs for the proportional and derivative terms, namely, the controlled variables or their inferential substitutes, and the measured load variables. This makes the network, when used as a controller, able to respond quickly and well to both changes in the setpoint and measured or unmeasured load disturbances. Because the controller is based on the prediction time requiring least controller action, the closed loop response will be essentially non-overshooting and non-oscillatory.

In addition to these improvements, there are also improvements which affect the performance and applicability of the network. First, the elimination of the optimization step from the operational phase minimizes the computational overhead when the network is utilized.

Second, training the network as an autoregressive moving average model (ARMA) produces a network which is robust at handling various types of processes. Proportional and derivative feedback makes the network effective at handling lag dominant processes as well as dead time dominant processes.

Although the preferred embodiments of the invention have been described hereinabove in detail, it is desired to emphasize that this is for the purpose of illustrating the invention and thereby to enable those skilled in this art to adapt the invention to various different applications requiring modifications to the apparatus described hereinabove; thus, the specific details of the disclosures herein are not intended to be necessary limitations on the scope of the present invention other than as required by the prior art pertinent to this invention.

We claim:

1. A system for providing an apparatus for use in controlling a process at a desired setpoint level, the process having process inputs and outputs, said system comprising:
   (a) a data base of training patterns representing historical values of the process inputs and process outputs;
   (b) a set of future time steps defining a future time horizon;
   (c) a prediction model constructed with the training patterns contained in said data base, for predicting the process outputs over said future time horizon;
   (d) a sensitivity processor utilizing said prediction model for determining the effect in the process outputs as a result of changes made to the historical values of the process inputs, said sensitivity processor producing predicted process outputs;
   (e) a first processing element for computing a prediction time where a greatest value in the predicted process outputs occurs, the prediction time being an optimum prediction time;
   (f) a second processing element for computing the predicted process output as advanced by the optimum prediction time;
   (g) said apparatus comprising:
      (i) an input means for receiving input variables for operating said apparatus, the input variables comprising the historical values of the process inputs and outputs from said data base, optimum prediction times, and the predicted process outputs as advanced by the optimum prediction times;
      (ii) an output means for generating output variables for use in controlling the process in a preferred manner; and
      (iii) a processing means for mapping said input means to said output means, said processing means comprising a function for performing said mapping, said function determining an optimum prediction time, and a predicted process output for performing said mapping, the optimum prediction time representing an effective response time of the process to a change in a desired setpoint level and the predicted process output representing a process output as advanced by the optimum prediction time;
   (h) a training system for training said apparatus in accordance with a training algorithm; and (i) a third processing element for configuring said apparatus to receive all of said input variables and for operating said training system to train said apparatus with all of said input variables thereby producing output variables for use in controlling the process.

2. A system as in claim 1 wherein said output variables comprise the predicted process outputs used in determining the manipulated variables which will affect the process in a preferred manner.

3. A system as in claim 2 wherein said output variables further comprise the optimum prediction time.

4. A system as in claim 1 wherein said output variables comprise the manipulated variables for use in controlling the process, the manipulated variables representing a change in the process needed to produce the process output as advanced by the optimum prediction time.

5. A system as in claim 4 wherein said output variables further comprise the optimum prediction times.

6. A system as in claim 1 wherein said optimum prediction time comprises a plurality of optimum prediction times for each time step of the process, wherein said manipulated variable comprises a plurality of manipulated variables for each time step of the process, wherein said predicted process output comprises a plurality of predicted process outputs for each time step of the process, and wherein said setpoint comprises a plurality of setpoints for each time step of the process.

7. A system as in claim 1 wherein said apparatus is a neural network comprising an input layer, an output layer, and at least one hidden layer, and wherein said input means comprises said input layer, said output means comprises said output layer, and said processing means comprising said hidden layer and said output layer.

8. A method for training an apparatus for controlling a process, the process having process inputs, process outputs comprising at least one controlled variable, and wherein the process is responsive to a manipulated variable used for changing the process as a function of the controlled variable, the method comprising the steps of:
 a) generating a model of the process to calculate predicted process outputs over a future time horizon, wherein the model is constructed using historical process data;
 b) applying the model to compute a change in the predicted process outputs that occurs as a result of a change made to the historical process data;
 c) determining a prediction time where an optimum change in the predicted process outputs occurs, the prediction time; being an optimum prediction time;
 d) computing a predicted process output advanced by the optimum prediction time; and
 e) training the apparatus with the predicted process output as advanced by the optimum prediction time and the historical process data to generate a corresponding variable for use in controlling the process.

9. The method of claim 8 wherein the step of generating a model further comprises the step of generating an autoregressive moving average model of the process from sampling values of the process inputs, the process outputs, and the process output over a future time horizon, said autoregressive moving average model producing predicted process outputs over the future time horizon.

10. The method of claim 8 wherein the step of determining the optimum prediction time comprises the step of determining the greatest rate of change in the process outputs as a result of changes made to the historical process data, the greatest rate of change representing the optimum change.

11. The method of claim 8 wherein the step of determining the optimum prediction time further comprises the step of determining the greatest change in the process outputs as a result of changes made to the historical process data, the greatest change representing the optimum change.

12. The method of claim 8 wherein the model constructed in the step of generating a model is a neural network.

13. The method as in claim 8 wherein the step of generating a model constructed using historical process data uses concurrent inputs for each time step of the process for the manipulated variables and the process outputs.

14. A method as in claim 13 wherein the step of generating a model constructed using historical process data further uses concurrent inputs for each time step of the process for the derivatives, with respect to time, of the process outputs.

15. A method as in claim 13 wherein the step of generating a model constructed using historical process data further uses concurrent inputs for each time step of the process for measured load variables representing measured load disturbances.

16. A method as in claim 13 wherein the step of generating a model constructed using the historical process data further uses concurrent inputs for each time step of the process for derivatives, with respect to time, of the measured load variables.

17. A method as in claim 8 wherein the process outputs are controlled variables representative of a measured process output.

18. A method as in claim 8 wherein the process outputs are inferential variables representative of an approximate indication of the measured process output.

19. A method as in claim 8 wherein the corresponding variable is the manipulated variable used for changing the process as a function of the measured process output.

20. A method as in claim 19 wherein said apparatus further generates said optimum prediction time.

21. A method as in claim 8 wherein the corresponding variable is the predicted process output as advanced by the optimum prediction time for use in determining a value of the manipulated variable which will affect the process in a preferred manner.

22. A method as in claim 21 wherein said apparatus further generates said optimum prediction time.

23. A method as in claim 8 wherein said apparatus is selected from a nonlinear function generator, a neural network, fuzzy logic processor, look-up table, or inferential logic machine.

24. A method for generating a nonlinear function generator for controlling a process having process inputs, process outputs comprising at least one controlled variable, and wherein the process is responsive to at least one manipulated variable for changing the process as a function of the controlled variable, the method comprising the steps of:
 a) collecting a plurality of historical values of manipulated variables and historical values of the process outputs generated from operations of the process and collected over a time span;
 b) pairing the manipulated variables with the process outputs based on the historical values in accord with an optimization criteria;
 c) retrieving training data generated from operations of the process and collected over the time span;
 d) calculating a plurality of future time steps representing a future time horizon;
 e) collecting a set of controlled variables as advanced by the future time horizon;

f) generating a prediction model using training input data, the paired manipulated variables and the process outputs based on the historical values, the plurality of future time steps, and the controlled variables as advanced by the future time horizon to compute predicted controlled variables as advanced by the future time horizon;

g) applying the prediction model to determine changes in the predicted controlled variables that occur as a result of changes made to the historical values of the manipulated variables, said application producing change variables;

h) selecting from the change variables, a subset representing the greatest changes in value;

i) storing the future time steps of the change variables in the subset produced in said selection step, the future time steps denoted as the selection times;

j) determining a greatest change from the range of changes defined by the subset of change variables produced from said selection step;

k) extrapolating the future times at which the greatest change occurs, the future times being the optimum prediction times;

l) computing predicted controlled variables as advanced by the optimum prediction times; and m) training the nonlinear function generator with the predicted controlled variables as advanced by the optimum prediction times and the historical process data to compute corresponding variables for use in controlling the process.

25. A method as in claim 24 wherein the corresponding variables are the predicted process outputs as advanced by the optimum prediction times used in determining values of the manipulated variables which will affect the process.

26. A method as in claim 39 wherein said nonlinear function generator generates said optimum prediction times.

27. A method as in claim 24 wherein the corresponding variables are manipulated variables used for controlling the process.

28. A method as in claim 27 wherein said nonlinear function generator generates said optimum prediction times.

29. A method as in claim 24 wherein the process outputs are controlled variables representative of a measured process output.

30. A method as in claim 24 wherein the process outputs are inferential variables representative of approximate indications of the controlled variables.

31. The method of claim 24 wherein the step of retrieving training data further comprises the step of collecting the derivatives, with respect to time, of the historical values of the process outputs for use in generating the prediction model.

32. The method of claim 24 wherein the step of retrieving training data further comprises the step of collecting a plurality of historical values of measured load variables generated from operations of the process over the time span, the historical values of measured load variables representing measured load disturbances, and wherein the step of generating a prediction model uses the additional inputs of the historical values of the measured load variables.

33. The method of claim 32 wherein the step of collecting a plurality of historical values further comprises the step of collecting the derivatives, with respect to time, of the historical values of the measured load variables for use in generating the prediction model and wherein the step of generating a prediction model uses the additional inputs of the derivatives of the historical values of the measured load variables.

34. The method of claim 24 wherein the step of applying the prediction model further comprises the steps of:

a) utilizing the prediction model to generate a first set of predicted controlled variables as advanced over the future projection horizon;

b) applying the prediction model with changes made to the historical values of the manipulated variables thereby generating a second set of predicted controlled variables as advanced over the future prediction horizon; and c) taking the difference between the first set of predicted controlled variables and the second set of predicted controlled variables thereby producing change variables representing the difference.

35. A method as in claim 24 wherein the step of applying the prediction model further comprises the step of:

a) utilizing the prediction model to generate a first set of predicted controlled variables as advanced over the future projection horizon;

b) applying the prediction model with changes made to the historical values of the manipulated variables thereby generating a second set of predicted controlled variables as advanced over the future prediction horizon;

c) taking the difference between the first set of predicted controlled variables and the second set of predicted controlled variables thereby producing difference variables; and d) computing the rate of change from the difference variables, wherein said computation consists of computing the difference between two difference variables having consecutive future time steps, the resulting rates of change being the change variables.

36. The method of claim 24 wherein the step of applying the prediction model further comprises the steps of:

a) selecting one historical value of the manipulated variables, herein denoted as the selected manipulated variable;

b) altering the selected manipulated variable by a small quantity;

c) collecting a set of historical values of the manipulated variables which does not contain the selected manipulated variable;

d) applying the prediction model with the selected manipulated variable, the set of historical values of the manipulated variables, the historical values of the process outputs, and the training input data, wherein said application produces predicted controlled variables as advanced over the future projection horizon;

e) selecting from the predicted controlled variables, the paired predicted controlled variable that correspond to the selected manipulated variable;

f) storing the paired predicted controlled variables;

g) repeating steps a) through f) for another historical value of the manipulated variable; and h) outputting the stored predicted controlled variables, the stored predicted controlled variables being the changed predicted controlled variables.

37. A method as in claim 24 wherein said nonlinear function generator is selected from neural network, fuzzy logic processor, look-up table, or inferential logic machine.

* * * * *